US009086876B2

(12) United States Patent
Gustaffson

(10) Patent No.: US 9,086,876 B2
(45) Date of Patent: Jul. 21, 2015

(54) TECHNIQUE FOR SELECTING A FREQUENCY OF OPERATION IN A PROCESSOR SYSTEM

(75) Inventor: Harald Gustaffson, Lund (SE)

(73) Assignee: TELEFONAKTIEBOLAGET L M ERICSSON (publ), Stockholm (SE)

( * ) Notice: Subject to any disclaimer, the term of this patent is extended or adjusted under 35 U.S.C. 154(b) by 394 days.

(21) Appl. No.: 13/579,923

(22) PCT Filed: Feb. 22, 2011

(86) PCT No.: PCT/EP2011/052626
§ 371 (c)(1),
(2), (4) Date: Sep. 26, 2012

(87) PCT Pub. No.: WO2011/104245
PCT Pub. Date: Sep. 1, 2011

(65) Prior Publication Data
US 2013/0013911 A1     Jan. 10, 2013

Related U.S. Application Data

(60) Provisional application No. 61/310,375, filed on Mar. 4, 2010.

(30) Foreign Application Priority Data

Feb. 25, 2010   (EP) ..................................... 10001951

(51) Int. Cl.
G06F 1/32    (2006.01)

(52) U.S. Cl.
CPC .............. *G06F 1/3203* (2013.01); *G06F 1/324* (2013.01); *Y02B 60/1217* (2013.01)

(58) Field of Classification Search
CPC ............ G06F 1/32; G06F 1/324; G06F 1/329
USPC .................................. 713/320, 324; 718/100
See application file for complete search history.

(56) References Cited

U.S. PATENT DOCUMENTS 8,190,930 B2 *   5/2012  Herdrich et al. .............. 713/300
2006/0168571 A1*  7/2006  Ghiasi et al. ................. 717/127
(Continued)

FOREIGN PATENT DOCUMENTS

JP         2006-268246       * 10/2006

OTHER PUBLICATIONS

International Preliminary Report on Patentability, mailed Sep. 7, 2012, in connection with International Application No. PCT/EP2011/052626.
(Continued)

*Primary Examiner* — Chun Cao
(74) *Attorney, Agent, or Firm* — Leffler Intellectual Property Law, PLLC

(57) ABSTRACT

The present disclosure relates to a technique for varying the frequency of operation of one or more cores in a processor device capable of operating at different frequencies and voltages. A method aspect of this technique includes executing one or more tasks on the at least one processor core, wherein the tasks are grouped into groups, monitoring usage of the at least one processor core by tasks in the groups on a per group basis, aggregating the monitored usage of the at least one processor core by individual groups across the groups to derive a load parameter indicative of the combined usage of the at least one processor core by the tasks in the groups, selecting a frequency of operation based upon the load parameter, and changing the frequency of operation of the at least one processor core to the selected frequency of operation.

26 Claims, 22 Drawing Sheets

(56) References Cited

U.S. PATENT DOCUMENTS

2007/0074011 A1* 3/2007 Borkar et al. .............. 712/227
2009/0217277 A1  8/2009 Johnson et al.
2010/0169609 A1* 7/2010 Finkelstein et al. ......... 712/43
2011/0213991 A1* 9/2011 Wolfe et al. ............... 713/300

OTHER PUBLICATIONS

PCT International Search Report, mailed Mar. 29, 2011, in connection with International Application No. PCT/EP2011/052626.

Menage, P. "Linux Kernel Documentation::cgroups.txt" Oct. 13, 2008, XP002593015. Retrieved from the Internet: URL:http://www.mjmwired.net/kernel/Documentation/cgroups.txt.

Menage, P. et al. "[Devel] Re: Revert for cgroups CPU accounting subsystem patch" Nov. 13, 2007, XP002593728. Retrieved from the Internet: URL:http://www.mail-archive.com/devel@openvz.org/msg05957.html.

* cited by examiner

A runtime per core

A runtime per core
with varying latency

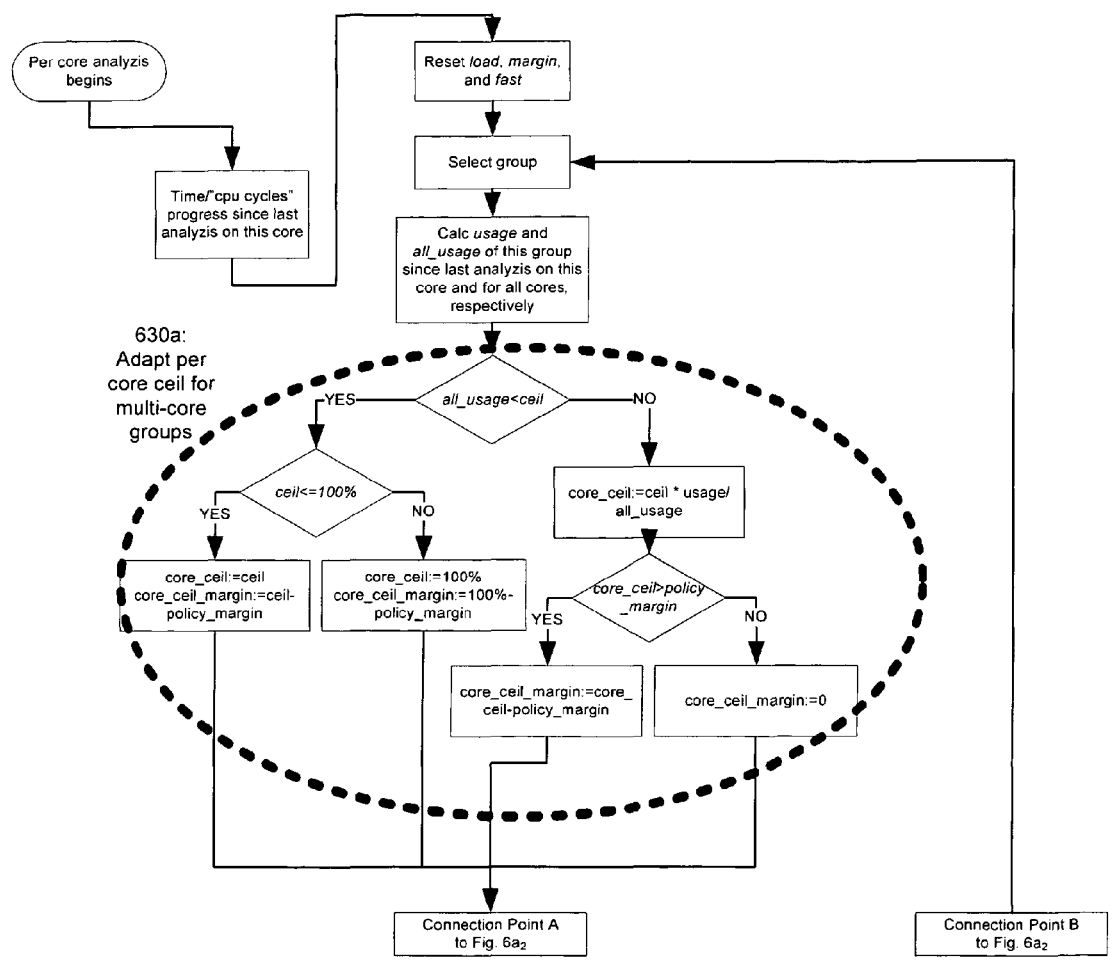
Fig. 6a₁

Fig. 6a₂
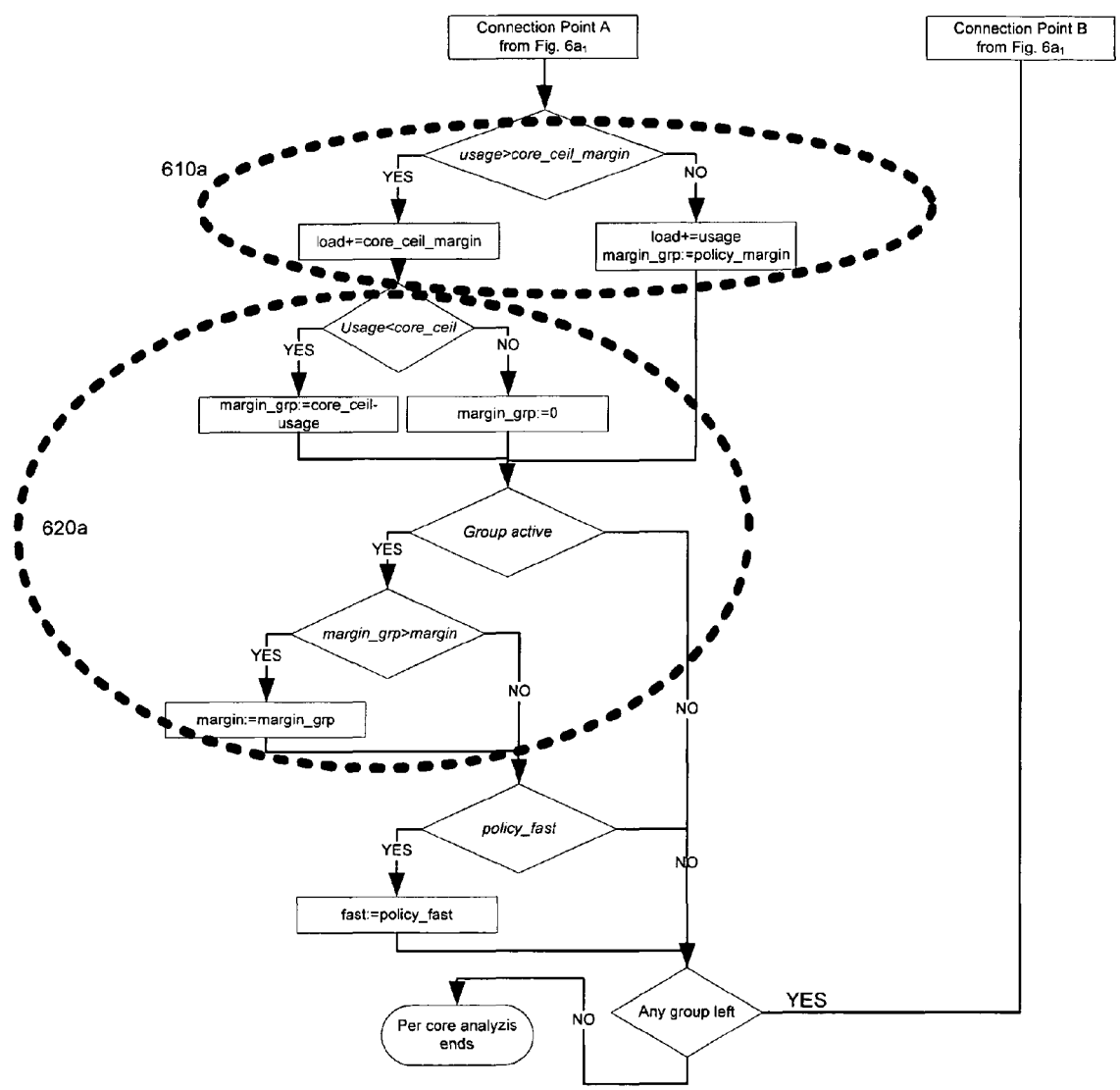

Fig. 6c₁
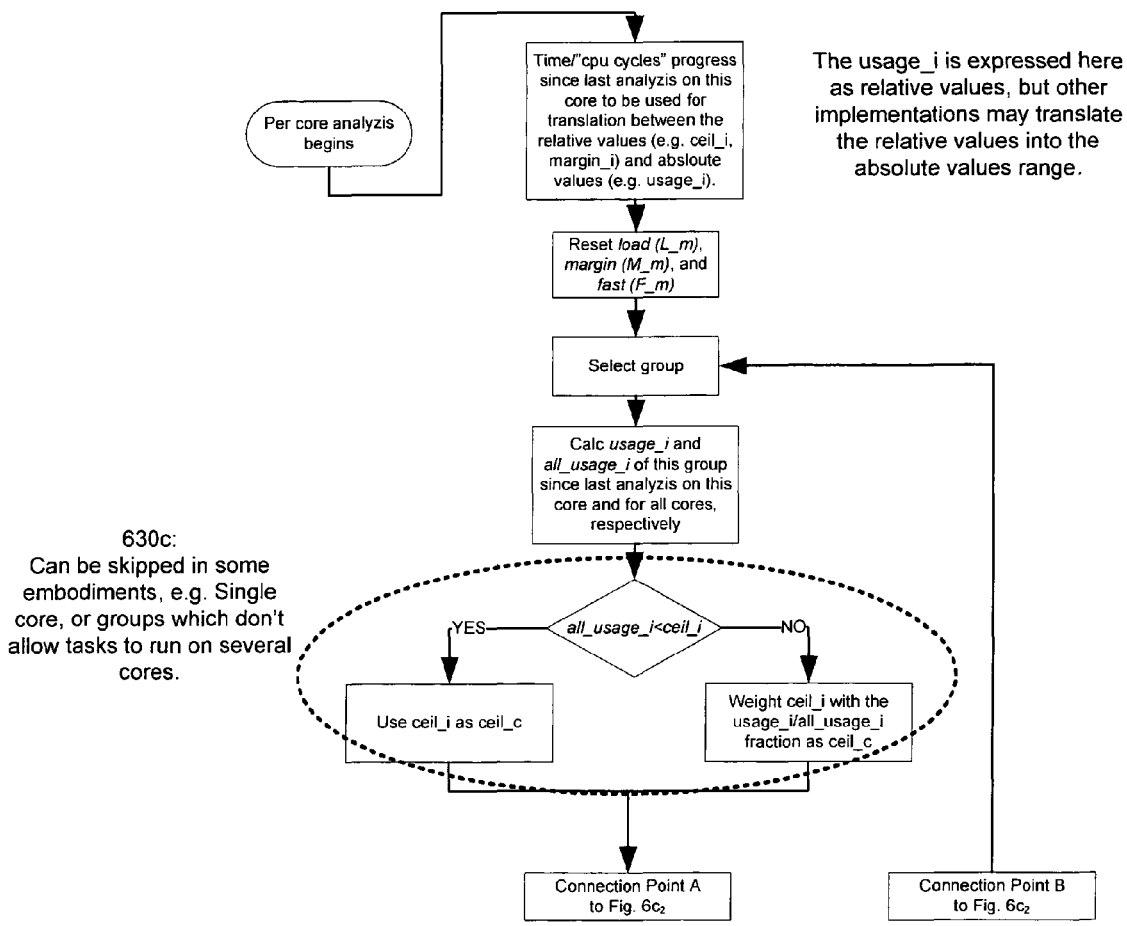

Fig. 6c₂
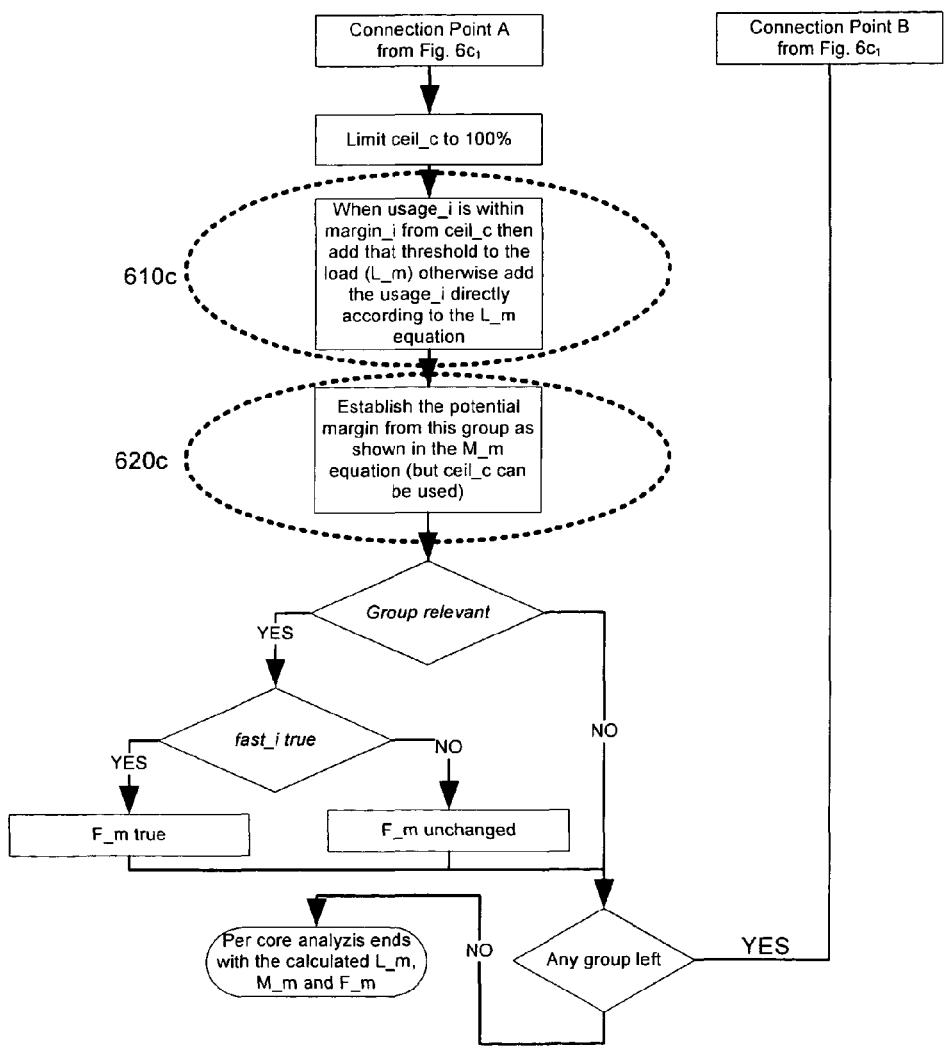

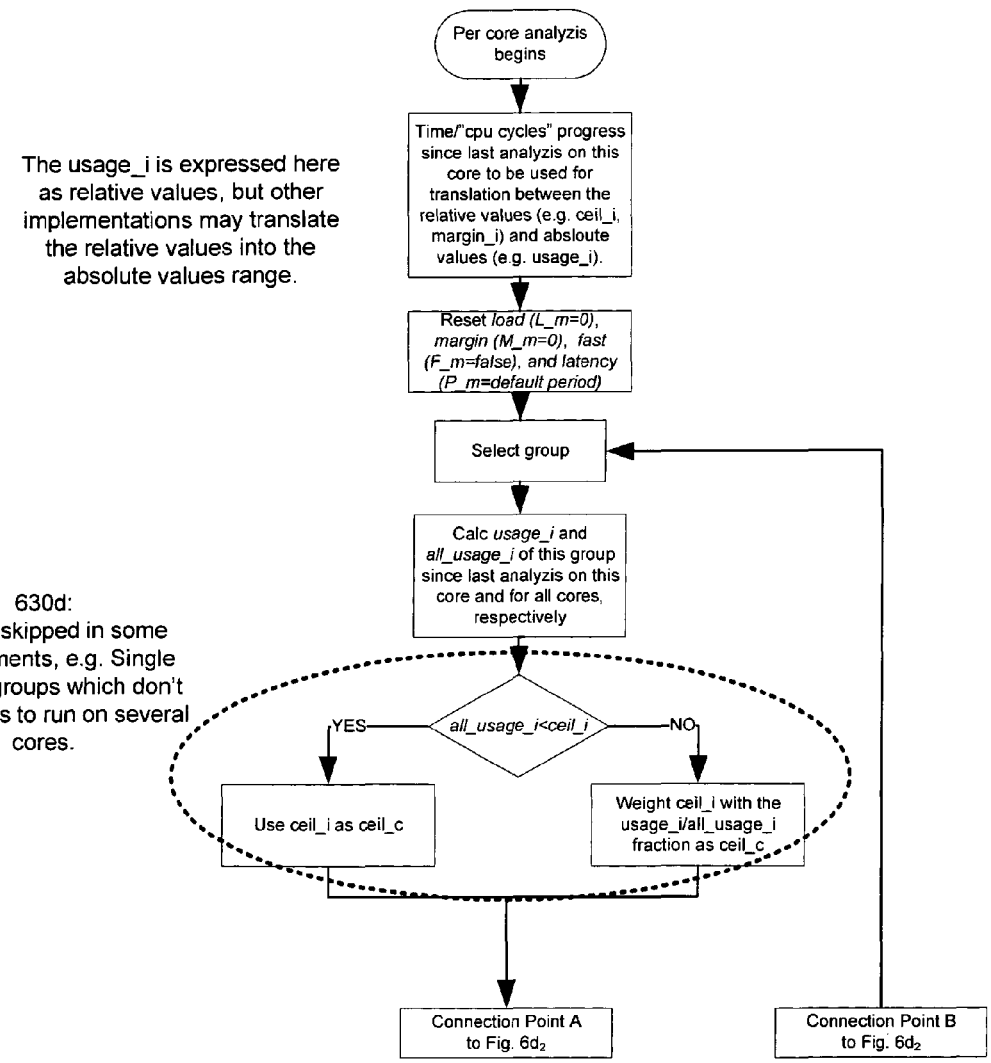
Fig. 6d₁

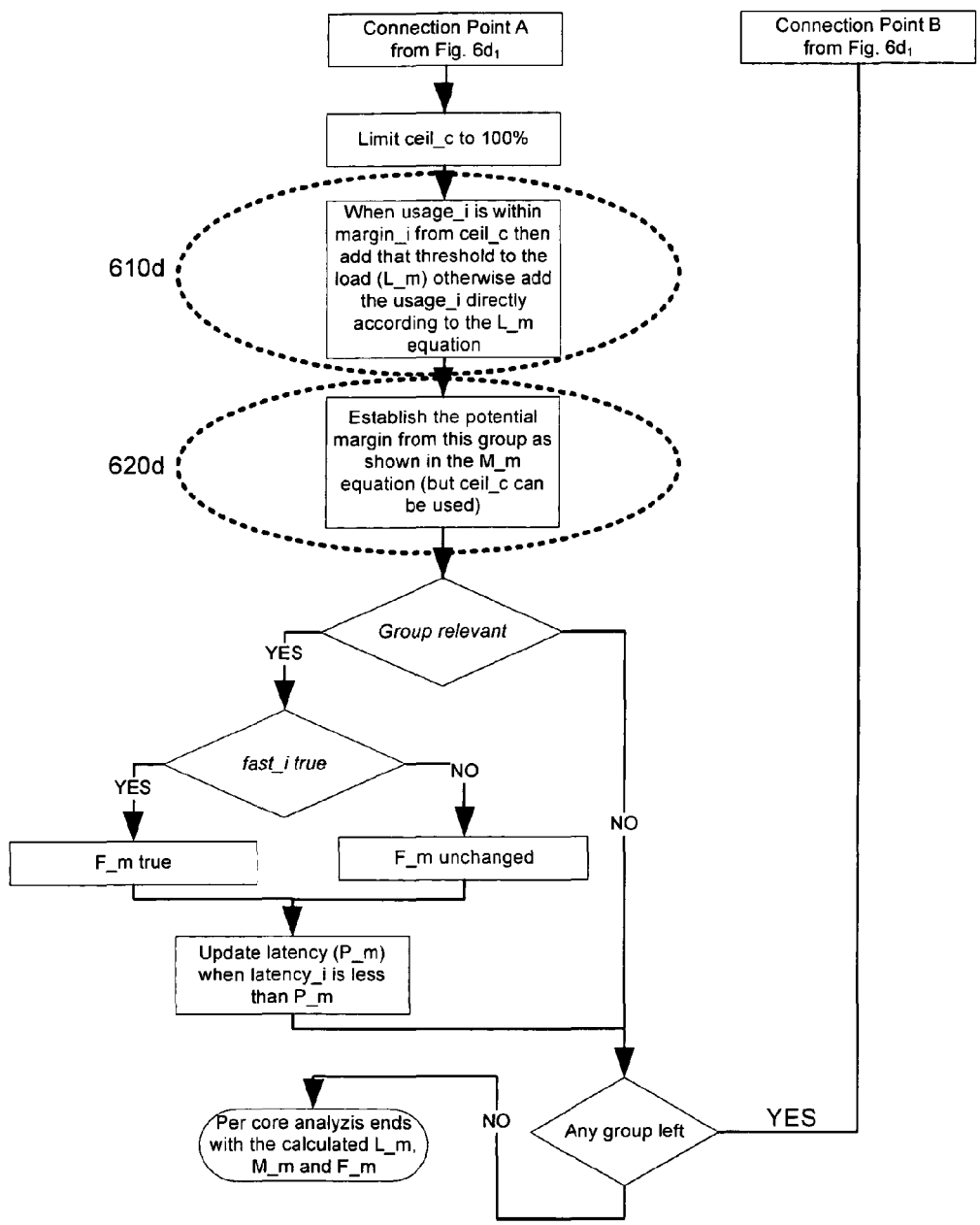
Fig. 6d₂

TECHNIQUE FOR SELECTING A FREQUENCY OF OPERATION IN A PROCESSOR SYSTEM

CROSS-REFERENCE TO RELATED APPLICATIONS

This application claims priority under 35 U.S.C. §119 to European Patent Application No. 10001951.2, filed Feb. 25, 2010, which is hereby incorporated herein by reference in its entirety. This application also claims the benefit of U.S. Provisional Application No. 61/310,375, filed Mar. 4, 2010, which is hereby incorporated herein by reference in its entirety.

TECHNICAL FIELD

The present disclosure generally relates to a processor device. In particular, the present disclosure relates to a technique for varying a frequency of operation of one or more processor cores of the processor device.

BACKGROUND

Many devices including computers have processors that can run at different frequencies. Modern processors have one or more processor cores comprised of transistors which generally require higher voltage to switch states faster when operated at an increased frequency. Running a processor (or processor core) at different frequencies and corresponding voltages over time is referred to as dynamic voltage and frequency scaling (DVFS). For example, a processor core may operate at 500 MHz at 1.2 volts, 250 MHz at 1.1 volts, and 125 MHz at 1.0 volts.

A processor device typically uses less energy when run at a lower frequency because of the decrease in the voltage level required for operation of the processor core. Furthermore, operating at lower frequency may increase the overall power efficiency relative to processing performance since the dynamic power is derived as the square of the voltage level but the increase in processing time due to the lowered frequency only increases linearly.

Modern processor devices include an operating system or BiOS with a frequency governor functionality. Typically, the frequency governor regulates the processor core operation by analyzing how much idle time is available to the processor device. When a processor device is idle it does not do any meaningful task. More particularly, when a processor core is idle, the core does not perform any useful computation. The frequency governor then utilizes a policy to decide what frequency is suitable to operate a processor core at to fulfill the current processing requirements of currently executed software.

The frequency governor generally implements the policy at the processor system level. It is possible to effect the policy by setting parameters such as, for example, the margin of idle time desired. For example, if the desired margin of idle time is 20%, the frequency governor will cause the one or more processor cores to step up the frequency of operation if less than 20% of currently available core cycles of idle time is available at the current frequency. The frequency governor will thus choose a higher core frequency which can maintain the load and margin. Also it is possible for the frequency governor to switch the processor cores between operation states that prioritize computational performance (for example, by running the cores at maximum core frequency independent of load) or energy conservation (for example, by running the cores at minimum core frequency independent of load) or a combination of both.

Modern computing systems and the processor devices they contain generally run many different types of software. Thus, different tasks from different types of software having, in some examples, strongly differing processing requirements are run on processor cores simultaneously. Typically, all executing tasks from the various types of software are all constrained to adhere to the same and relatively fixed frequency settings set by the frequency governor. This prevents, for example, prioritizing performance for interactive applications which may require a large amount of core performance, and thus computational power, to be readily available while prioritizing conserving power during the performance of background services, which may require less or a known relatively constant core performance to be available.

United States Patent Application Publication US 2009/0217277 discloses assigning similar threads to each processing unit, so that threads having similar characteristics are executed by a processing unit. The Linux Kernel Documentation by Paul Menage discusses the Linux Control Group, or cgroup, mechanism. In Re: Revert for cgroups CPU accounting subsystem patch, Paul Menage discusses monitoring resource usage statistics for groups.

SUMMARY

Accordingly, it is an object of the technique disclosed herein to provide for selection of an efficient frequency of operation relative to the diverse tasks that may be executed on a processor device having one or more processor cores. In particular, a technique is needed that allows for minimizing power consumption while simultaneously providing adequate core performance for executing tasks.

To this end, according to a first aspect, a method for selecting a frequency of operation for a processor core is provided. The method comprises executing one or more tasks on the at least one processor core, wherein the tasks are grouped into groups, monitoring usage of the at least one processor core by tasks in the groups on a per group basis, aggregating the monitored usage of the at least one processor core by individual groups across the groups to derive a load parameter indicative of the combined usage of the at least one processor core by the tasks in the groups, selecting a frequency of operation based upon the load parameter, and changing the frequency of operation of the at least one processor core to the selected frequency of operation.

Monitoring usage of the at least one processor core may comprise repeatedly measuring usage of the at least one processor core by individual tasks in the groups over time. More particularly, in various implementations, the usage of the at least one processor core may be measured periodically or aperiodically over time by a frequency governor. For example, the frequency governor may measure the usage intermittently, in response to stimulus, such as hardware stimuli including operating temperature change, interrupts, state change or other stimuli, or periodically based upon one or more predefined measurement periods. Of course the functionality of the frequency governor may be implemented by or across other modules (such as a scheduler) in communication with the frequency govenor. For purposes of simplifying further exposition of aspects of the technique disclosed, aspects will be discussed with regard to a frequency governor, but it will be understood that equivalents are covered by the term frequency governor.

One or more group settings may be assigned to each of the groups, and the method may further comprise aggregating the usage across the groups subject to one or more of the one or more group settings. As an example, the group settings may individually control (e.g., select, limit or weight) the contribution of each individual group during the usage aggregation process. In this manner, different groups may contribute in a controllable manner to the load parameter resulting from the aggregation process.

The one or more group settings for one or more of the groups may comprise a measurement period such as that discussed above. In such a scenario, measuring the usage of the at least one processor core and/or deriving the load parameter may be performed periodically based on the at least one measurement period. When different measuring periods are assigned to different groups, in one implementation the usage measurements are performed subject to the shortest applicable measurement period.

According to various implementations, the group settings may additionally, or alternatively, comprise at least one of a ceil parameter and a margin parameter. The ceil parameter may be defined as a target maximum usage of the at least one processor core by the tasks in the associated group, and the margin parameter may be defined as a target margin between an actual usage of the processor core and a target frequency of operation of the processor core. The frequency governor or any other system component may aggregate the usage across the groups subject to the ceil parameter and/or the margin parameter.

With regard to one aspect of implementation, the ceil parameter may be used to control the amount of usage aggregated for the tasks of the corresponding group. For example, the ceil parameter may specify a maximum usage for the corresponding group that can be used for purposes of aggregating usage across groups. Thus, in some realizations, the amount of usage that can be aggregated per group is limited to or by the ceil parameter corresponding to that group.

In yet further implementations, the margin parameter for each group may be used for determining the usage of the corresponding group to be used for purposes of aggregating across groups. For example, the margin parameter may be used with the ceil parameter to arrive at a usage for a group to be used for purposes of aggregating usages across groups. The ceil parameter and the margin parameter for a group may be mathematically combined (e.g., through subtraction or summation) to derive a usage for a group which is used for purposes of aggregating usages across groups.

The group settings may also be combined across one or more groups to derive a maximized margin parameter for the at least one core due to the executing tasks: The maximized margin parameter may be used to provide a performance tolerance for selecting the frequency of operation. Deriving the maximized margin parameter due to the executing tasks may comprise selecting a largest margin parameter subject to the group settings of the individual groups and/or the usage of the at least one core by one or more groups. More particularly, the largest margin parameter across the groups may be selected. Howsoever, if the group corresponding to the selected margin parameter does not have any tasks executing during the (current) measurement period on the processor core(s) or the tasks executing do not consume a minimum level of computing resources, then the selected margin parameter may be reduced to the value of the largest margin parameter of a group with tasks executing on the core(s). By way of yet further example, the selected margin parameter may be constrained by the corresponding ceil parameter in the same group settings. According to this aspect, if the combined usage and margin parameter for a group exceed the ceil parameter for the group, the margin parameter may be reduced according to the ceil parameter.

In one or more implementations, selecting a frequency of operation based upon the load parameter may comprise summing the load parameter and the maximized margin parameter and then deriving a frequency value from the summation of the load parameter and maximized margin parameter. A frequency value may be derived from the summation of the load parameter and maximized margin parameter by, for example, multiplying the summation by a frequency conversion factor which converts the summation of the load parameter and maximized margin parameter into a derived frequency value which can be interpreted as an optimal frequency of the processor core for the executing tasks. Based upon this optimal frequency, the frequency governor may select the frequency of operation (and, optionally, a corresponding voltage) for the at least one processor core from among the available discrete frequencies (and, optionally, corresponding voltages).

The technique disclosed herein may be implemented in a processor system comprising a processor device with at least one processor core, the at least one processor core being operable to execute one or more tasks grouped into groups, and a frequency governor operable to monitor usage of the at least one processor core by tasks in the groups on a per group basis, aggregate the usage of the at least one processor core by individual groups across the groups to derive a load parameter indicative of the combined usage of the at least one processor core by the tasks in the groups, select a frequency of operation for the at least one processor core based upon the load parameter, and change the frequency of operation of the at least one processor core to the selected frequency of operation.

The processor device may further be a multi-core processor device and the frequency governor may control the frequency of operation of the at least one core to differ from the frequency of operation of one or more other processor cores of the multi-core processor device. The at least one processor core may operate at discrete frequencies and corresponding voltages of operation, wherein the governor is operable dynamically change the frequency of operation and the corresponding voltage of the at least one processor core to operate at an available discrete frequency.

The techniques presented herein may be realized in the form of software, in the form of hardware, or using a combined software/hardware approach. As regards a software aspect, a computer program product comprising program code portions for performing the steps presented herein when the computer program product is run or loaded on one or more computing devices may be provided.

The computer program product may be stored on a computer-readable recording medium such as a processor memory accessible by a processor core, memory chip, a CD-ROM, a hard disk, and so on. Moreover, the computer program product may be provided for download onto such a recording medium.

BRIEF DESCRIPTION OF THE DRAWINGS

Further aspects and advantages of the techniques and systems presented herein will become apparent from the following description of embodiments and the accompanying drawings, wherein:

FIGS. 6a-6e show pseudo-code for aspects of embodiments of the technique disclosed herein.

DETAILED DESCRIPTION

In the following description of preferred embodiments, for purposes of explanation and not limitation, specific details are set forth (such as particular processor core(s), frequency governor components and sequences of steps) in order to provide a thorough understanding of the technique presented herein. It will be apparent to one skilled in the art that this technique may be practiced in other embodiments that depart from these specific details. For example, the technique discussed herein may be used with one or more processor cores and extended to processor cores with continuously variable frequencies.

Moreover, those skilled in the art will appreciate that the functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in context with methods and devices, the present disclosure may also be embodied in a computer program product which can be loaded to run on a system comprising a computer processor and a memory coupled to the processor, for example, a processor core and a processor memory accessible by the processor core, wherein the memory is encoded with one or more programs that may perform the functions and steps disclosed herein.

Figure 1A:
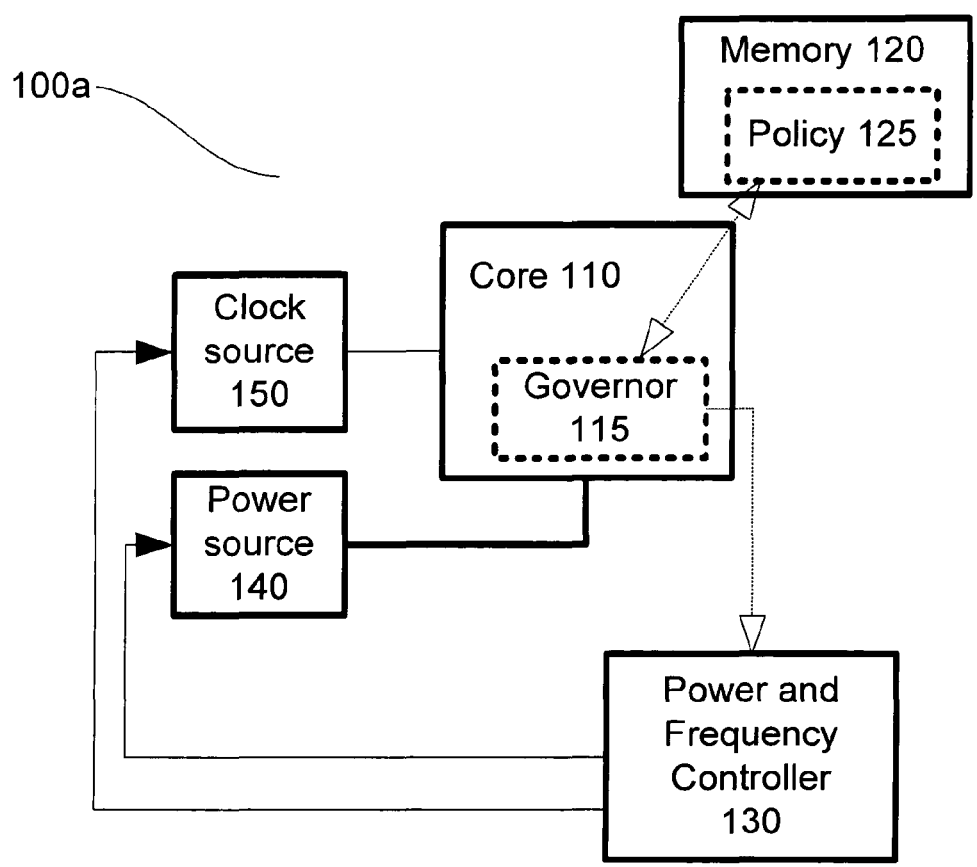
FIGS. 1$a$-1$c$ illustrate various embodiments of processor devices.
Figure 1B:
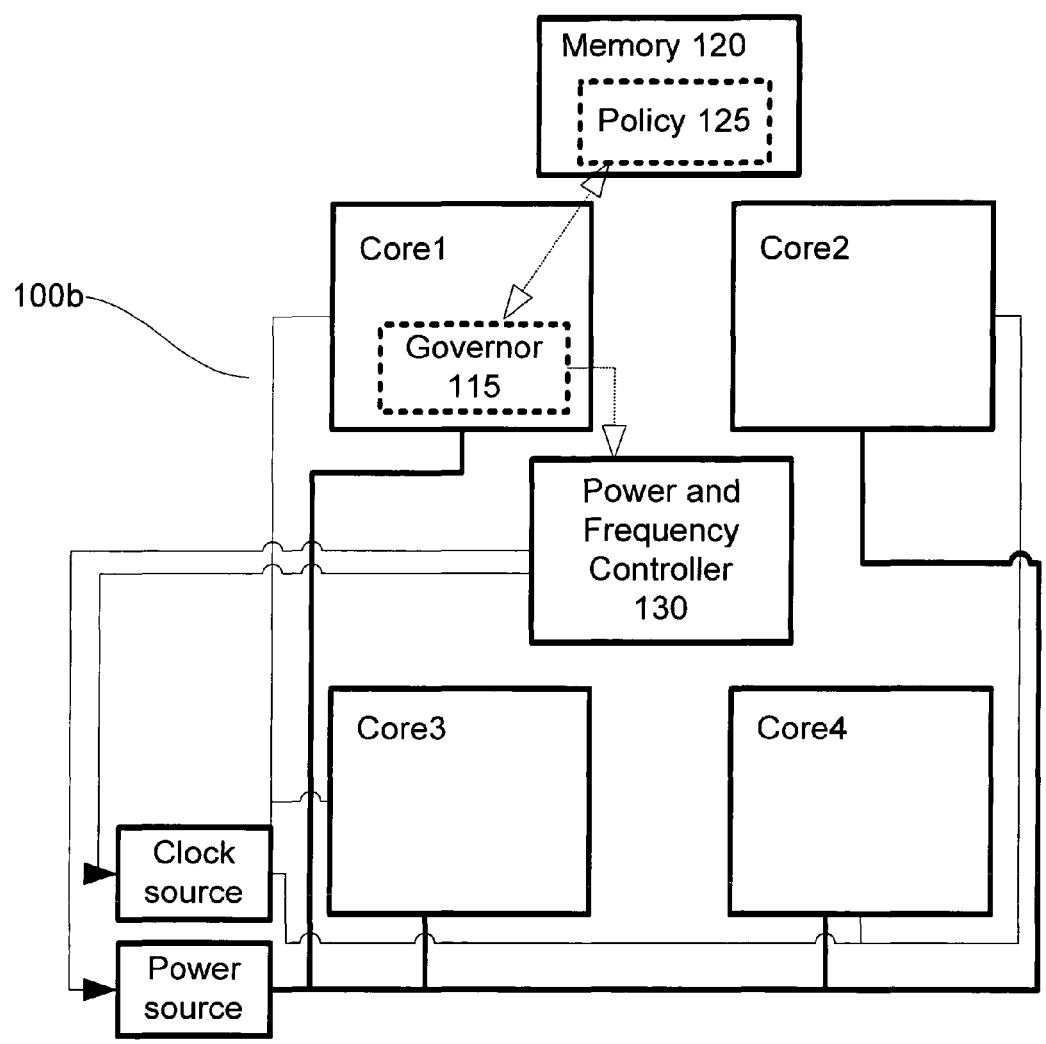
Figure 1C:
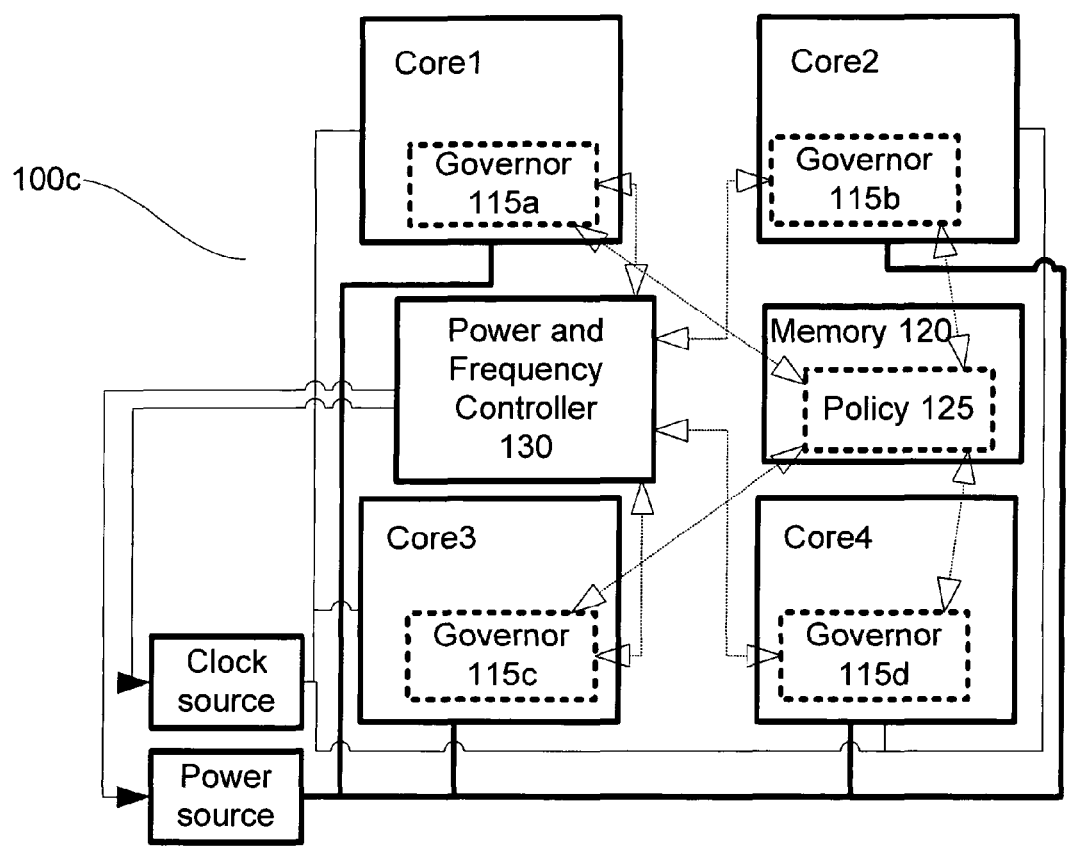

FIGS. 1a-1c illustrate various embodiments of processor devices 100a-100c. Processor device 100a is one example of a single core processor device. Single core processor device 100a comprises a processor core 110, a frequency governor 115, a memory 120 coupled to core 110 and storing a policy 125 for the frequency governor 115, and a power and frequency controller module 130 coupled to both a power source 140 and a clock source 150, and operable to control the same. The frequency governor policy 125 may generally be stored in the memory 120 in the form of a predefined data structure (such as a data set) accessible by the frequency governor 115. The frequency governor 115 and policy 125 may be implemented as software running on the processor device 100a and may be provided as part of an operating system kernel.

As illustrated in processor device 100a, frequency governor 115 runs on core 110 as a task and is operable to access policy 125 residing in memory 120. Frequency governor 115 may further be operable to control power and frequency controller module 130 to vary the frequency output from clock source 150 to processor core 110 and the voltage output of power source 140 to core 110, thus allowing frequency governor 115 to dynamically select the frequency of operation of processor core 110 and the corresponding voltage of operation of processor core 110.

Processor devices 100b and 100c are different examples of multi-core processor devices, each of which contains four distinct processor cores. More particularly, in the embodiment represented by multi-core processor device 100b, frequency governor 115 is shown as being executed as one or more tasks on processor core 1 of the device 100b. In the embodiment represented by processor device 100c, frequency governor 115 is shown as being executed as one or more tasks on each of processor cores 1 to 4. In a multi-core processor device such as that of FIGS. 1b and 1c, the frequency governor 115 can thus be executed as one or more tasks across the processor cores.

In the following, the group concept underlying the embodiments discussed herein will be described in more detail before discussing various implementations of this group concept with respect to controlling an operation frequency of a processor system. Generally, on Linux systems, the concept of grouping individual tasks into control groups, referred to as cgroups, has recently been introduced. Each cgroup, or more broadly, group, may contain several or individual tasks, these tasks may be complete applications or parts of applications, and a group may also span many applications or many parts of applications. Each task may be a software thread which also includes kernel threads. Several usages of the cgroups have been shown, among them are: to schedule group of tasks to reserve a part of the CPUs processing, collect usage information of the tasks in a group, constrain the memory usage of a group, constrain input/output bandwidth usage.

Figure 2:
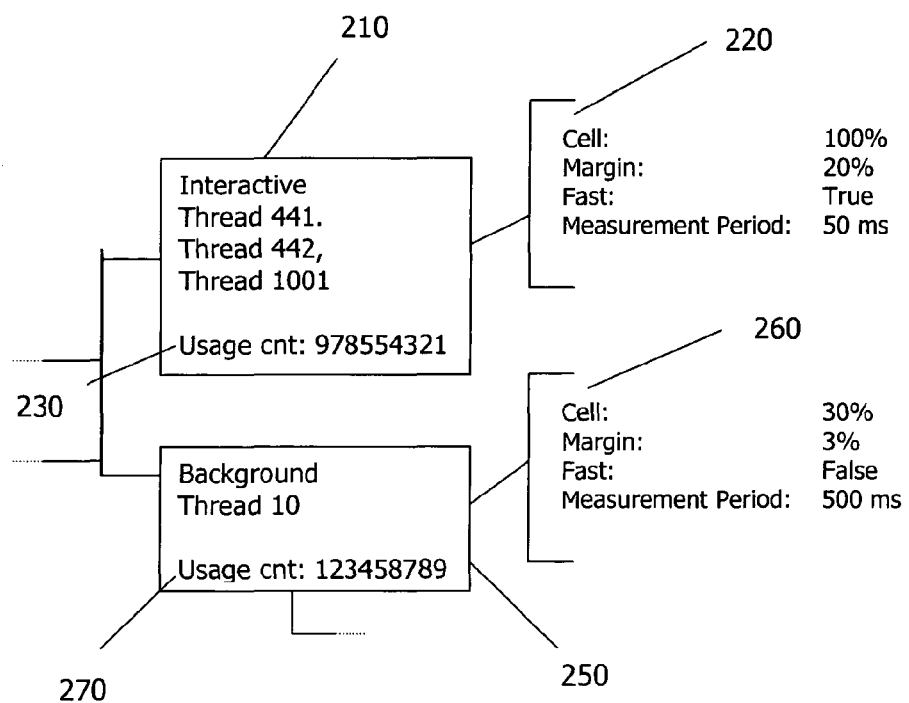
FIG. 2 illustrates an embodiment of groups and associated settings and/or parameters.

Turning now to FIG. 2, FIG. 2 illustrates embodiments of groups of tasks. These groups may be based on the cgroup paradigm discussed above. Generally, data defining the groups of tasks may be stored in a policy such as policy 125 of FIG. 1 or separately therefrom and may be accessible by frequency governor 115.

In FIG. 2, tasks, represented by software threads, are exemplarily grouped in two groups, interactive group 210 and background group 250. Group 210 is an exemplary grouping of three interactive tasks, represented by threads 441, 442 and 1001. These interactive tasks may require a relatively high core performance from a processor core because different or varying user interactions over time, for example with a graphical user interface, may suddenly require computationally intensive tasks to be swiftly completed (i.e. requiring a high frequency of operation). By contrast, group 250 is a grouping comprising a background task, represented by thread 10. This background task may be adequately performed with a relatively low core performance from a processor core because the speed with which the task is to be executed is of relatively little importance and the tasks may be executed according to a relatively constant core performance.

According to aspects of the present technique, each group may be associated with group settings which specify parameters associated with executing tasks in the group as illustrated in FIG. 2. Group settings may be stored together with the respective groups in a policy such as policy 125 of FIG. 1. More particularly, in the present embodiment group settings of a group comprise a ceil parameter and a margin parameter for that group. The ceil parameter may be considered to be a target maximum usage of a core when the core is executing tasks in the group. For example, the ceil parameter may define a maximum usage of a core which may be required for appropriately executing tasks in the group. The margin parameter may be considered to be a target margin maintained at an actual usage of the processor core and a frequency of operation of the processor core when the processor core is executing tasks in the group. Thus, the margin parameter may be thought of as defining a core performance tolerance for executing tasks in the associated group.

Group settings further include other parameters such as a fast flag and a measurement period. The fast flag indicates a desire to step up to the maximum core performance under certain conditions, and the measurement period indicates a time interval at which it is desired for the frequency governor 115 to measure the usage of core(s) by tasks in the group and/or select/reselect a frequency of operation for the core(s) executing tasks in the group. The measurement period may be a normalized and/or common time interval across all the groups and so may be inherent to the groups and thus unnecessary to explicitly specify on a per group basis. Alternatively, the measurement period may be explicitly defined for each individual group as illustrated in FIG. 2, and frequency governor 115 may perform measurements and frequency selection based upon one or more specified measurement periods.

Returning to FIG. 2, group 210 is associated with group settings 220 and group 250 is associated with group settings 260. Group settings 220 and 260 include a ceil parameter, a margin parameter, a fast flag and a measurement period. As previously discussed, the tasks in group 210 require high core performance, while the task in group 250 is a background task requiring a relatively low core performance to be adequately performed. The different requirements of groups 210 and 250 are reflected in the different group settings associated with the two different groups. Group settings 220 reflect the need for a relatively high core performance: the ceil parameter is specified as 100% of core performance, the margin parameter is specified as a relatively high 20% and the fast flag is set to true. Group settings 260 reflect that the background task represented by thread 10 requires a relatively low core performance to be adequately performed: the ceil parameter is specified as 30% of core performance, the margin parameter is specified as a quite low 3% and the fast flag is set to false, indicating a stepwise increase in frequency is sufficient.

The embodiments described herein leverage groups of tasks as defined above to dynamically vary the frequency of operation of a processor core to both optimize performance and conserve power consumption for the tasks executing on the processor core. To this end, the frequency governor may monitor the usage of one or more processor cores on a task level and select the frequency of operation of the processor core(s) based upon the monitored usage of the processor core(s) by the tasks in the groups. The usage-related aspects of the technique disclosed herein will now be explained in more detail based on the group paradigm introduced above.

Specifically, the frequency of operation and the corresponding voltage are set by the frequency governor at a processor core level based upon the combined usages of a processor core across the groups with tasks executing on the processor core, thus providing an optimized core performance at the processor core for executing tasks, while simultaneously minimizing power consumption of the processor core. For example, the monitored usage of one or more processor cores may be combined across the groups on a per core basis through aggregation to determine an optimal frequency of operation of a processor core, which may then be used to select one of the available frequencies of operation of the processor core for the processor core to operate at. In addition, in a further aspect, the usage of a processor core by the currently executing tasks is aggregated subject to or with one or more group settings to select one of the available frequencies of operation of the processor core for the core to run at.

Turning now to monitoring the usage of processor cores by tasks executing on said processor cores, groups are used as a mechanism for monitoring and/or recording the usage of processor cores on a per group or per task level. More particularly, each group can be associated with one or more usage counters. Using the example of a single counter per group, said single counter corresponding to a single processor core, the usage of any task in the group of the processor core may be monitored by the frequency governor (or any other component coupled to the frequency governor, such as a scheduler) and recorded in the counter. This may be done by the frequency governor for all tasks in the group, thus compiling a usage of the corresponding processor core by the tasks in the group. In the case of a multi-core processor, this may be done for each of the cores and a group may then have at least one counter corresponding to each processor core. In other aspects, a counter can exist per task and per core and the usage of each task per core recorded for the groups. Then the logged usage across counters can be aggregated to determine the per core usage for the tasks in a group. Of course other variants and mechanisms for logging usage of tasks in a group will be readily apparent to those of skill in the art. In a further aspect, the counter values or the monitored usage may be stored as parts of the group parameters in memory 120. Thus, the usage per core may be monitored per group or per executing task. The usages of processor cores across groups by executing tasks may provide an indication of the required future usage of cores.

In the example illustrated in FIG. 2, each group 210, 250 is associated with a single usage counter that logs the combined usage of a corresponding core by executing tasks in the respective group. Group 210 is associated with usage counter 230 and group 250 is associated with usage counter 270. In this example, the usage counter associated with the respective group is incremented based upon the core usage of the currently executing tasks in the group to monitor a usage of the corresponding core over a time period by any of the tasks in the group. For example, the usage counters may be incremented based on the consumption of core cycles normalized with the core frequency by any of the tasks in the corresponding group.

Figure 3:
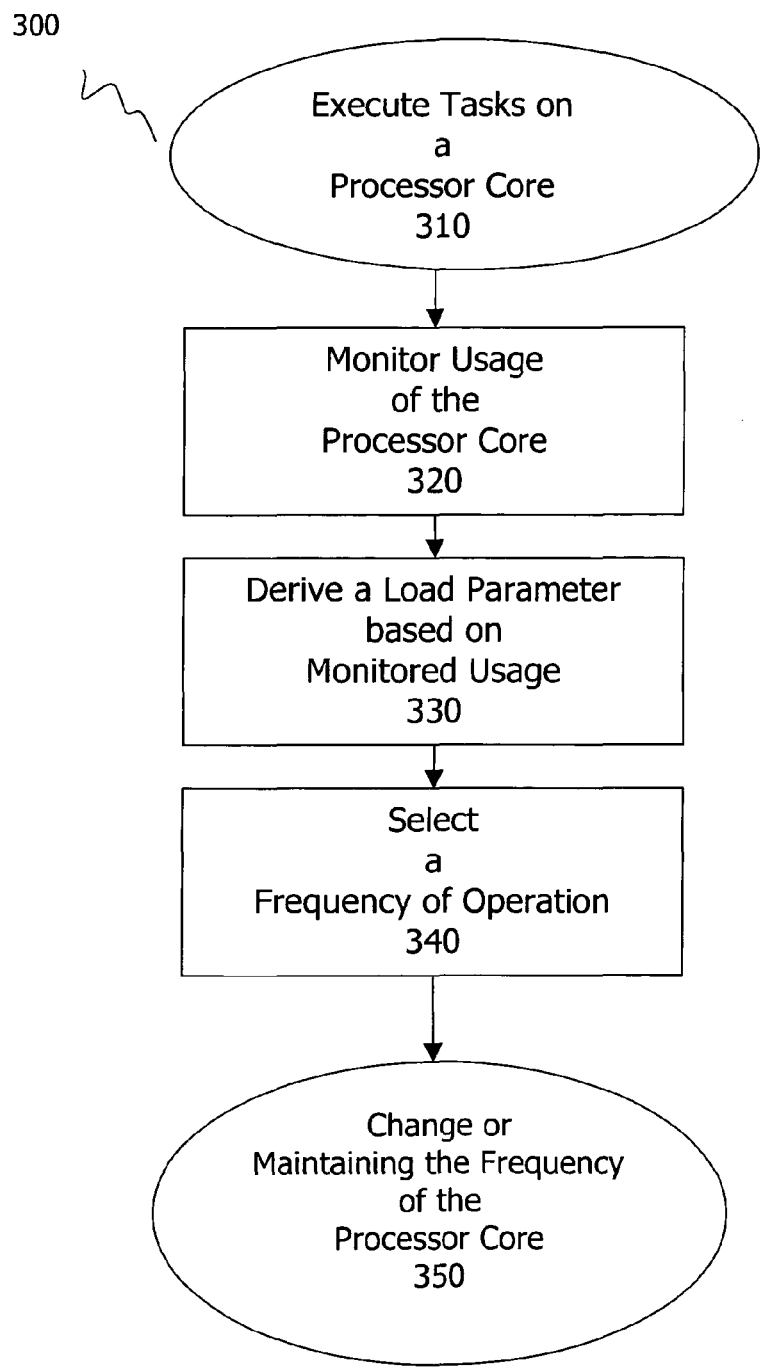
FIG. 3 shows a flow diagram of a method embodiment for aspects of selecting a frequency of operation of a processor core.

FIG. 3 provides flow diagram 300 illustrating aspects of a method embodiment of the technique presented herein. In this embodiment, multiple tasks are executed on a processor core such as core 110 of processor device 100*a* of FIG. 1. FIGS. 1 and 2 will be used hereinafter as examples for discussing the steps of flow diagram 300.

Applying the groups of FIG. 2 to processor device 100*a* of FIG. 1, policy 125 comprises data structures defining groups 210 and 250 as well as corresponding group settings 220 and 260, corresponding to groups 210 and 250, respectively. Policy 125 further comprises usage counters 230 and 270, also corresponding to groups 210 and 250, respectively.

At step 310, multiple tasks are executing on a processor core such as core 110 of processor device 100*a* of FIG. 1. At step 320 of flow diagram 300, the usage of the processor core is monitored. Continuing on with the example relative to processor device 100*a*, in one aspect of step 320, frequency governor 115 can access and use usage counters 230 and 270 to log the usage of processor core 110 by the executing tasks in respective groups 210 and 250, and then, at steps 330 and 340, aggregate the logged usage of processor core 110 by tasks of groups 210 and 250 subject to the group settings to derive an optimized frequency of operation for processor core 110, and based upon the derived optimized frequency, select a frequency of operation from among the discrete available frequency of operations supported by processor device 100*a* for processor core 110 to operate at. Of course in other aspects, the technique disclosed herein can be extended to any number of processor cores and groups: two groups are merely used here for simplicity of example.

By way of more detailed explanation of step 320 of flow diagram 300, with regard to FIGS. 1 and 2, each group 210, 250 in policy 125 is associated with group settings 220, 260 that contain a measurement period. This specified measurement period indicates a period for measuring the usage of processor core 110 for the groups and for selecting a frequency of operation. Because group 210 is a grouping of interactive tasks that may vary more strongly in core performance requirements, the measurement period is a relatively short 50 milliseconds (ms) which thus specifies that the measuring of usage and selecting a frequency is to occur periodically every 50 ms. With regard to group 250, because group 250 contains a background task which typically has a fairly constant core performance requirement, the measurement period is a relatively long 500 ms.

In one aspect, the period for performing the usage measurements may be taken as the shortest measurement period across the groups (i.e., 50 ms in the above example). In different aspects, the frequency governor can choose its own measurement period or may use a combination of the measurement periods of the groups, or select any of the measurement periods of the groups depending up various constraints, such as, for example, usage of the core and importance of the tasks executing. Of course, measuring the usage of the groups and selecting the frequency of operation may or may not occur periodically, or any of the combination of the above may be used.

Proceeding with the example of logging the usage of processor core 110 of processor device 100*a* according to aspects of step 320, at a time, usage counters 230 and 270 may be set to zero. Of course, one of skill in the art would understand that a monotonically increasing counter may be used also. In such a case the difference in counts between two successive measurement periods would be calculated. Subsequently thereafter, the usage of processor core 110 by threads 441, 442 and 1001 is logged in counter 230 by frequency governor 115 by incrementing counter 230 by each core usage cycle of threads 441, 442 and 1001, thus compiling the usage of processor core 110 by the tasks in group 210. Similarly, the usage of processor core 110 by thread 10 is logged in counter 270 by frequency governor 115 by incrementing counter 270 by each core usage cycle of thread 10, thus compiling the usage of core 110 by the tasks in group 250.

Then, at step 330, usage may be aggregated across groups 210 and 250 subject to the respective group settings (e.g., ceil and margin parameters) to arrive at a load parameter indicative of the combined usage by the tasks in groups 210 and 250 on processor core 110. Subsequent to step 330, at step 340, this load parameter may be used to determine an optimal frequency of operation which can be used to select a frequency of operation of core 110 if necessary. For example, if the load parameter indicates that the current frequency of operation of core 110 is too low, the frequency of operation can be raised to an appropriate frequency of operation. Conversely, if the load parameter indicates that the current frequency of operation of core 110 is too high, the frequency of operation can be lowered to an appropriate frequency of operation. At step 350, the frequency governor can control the clock source and the power source to operate at the selected frequency of operation and corresponding voltage, respectively.

The following discusses aspects of selecting a frequency of operation at step 340 with respect to FIG. 1. If the optimum frequency of operation is above the current frequency of operation of core 110, then if the fast flag is set to no, the frequency of operation of the core is increased in a stepwise manner to the next available discrete frequency of operation. If, however, the fast flag is set to yes, thus indicating that at least one of the relevant groups contains one or more tasks that may require a maximum core performance to be made available, then the frequency of operation of core 110 is increased to the maximum available discrete frequency of operation and the core shall run at the corresponding maximum voltage.

If the optimum frequency of operation is below the current frequency of operation of core 110, then more core performance than is sufficient to execute all the tasks in the groups is being provided. That is, relating the above to the usage of core 110, core 110 is maintaining a larger margin of unused core performance than is necessary. If a lower discrete frequency of operation is available that is equal to or greater than the optimum frequency of operation, then the lowest available discrete frequency of operation that is equal to or greater than the optimum frequency of operation is selected as the new frequency of operation of core 110.

The above-described steps 310 to 350 may be carried out at periodic or varying intervals of time to dynamically change the frequency of operation of core 110. Because the frequency of operation is dynamically varied at the level of core 110, a frequency of operation of core 110 is continually selected that provides sufficient core performance to execute the tasks while simultaneously conserving power by using less power per cycle by, for example, operating at a lower frequency and a lower voltage. Of course, as will be understood by one of skill in the art, when applied across a multi-core processor, steps 310-350 will be performed for each of the processor cores and a frequency of operation selected across the processor device and/or per processor core of the processor device.

The aggregation process to determine the load parameter in step 330 of FIG. 3 will now be discussed in more detail with respect to the role of the further group settings. Turning first to the ceil parameter, this parameter can be used for purposes of the above technique to define a "ceiling" limiting (or clipping) the usage aggregated for a group to an appropriate usage for the group when determining the load parameter at step 330. For example, take the instance where none of threads 441, 442 or 1001 are (currently) executing on core 110. Ideally, then background thread 10 would be using much of the usage made available on processor core 110, and the usage of processor core 110 by thread 10 would be much higher than actually needed by thread 10, because the task represented by thread 10 is being executed with the spare capacity of core 110 to faster complete the task represented by thread 10. Accordingly, if the usage of thread 10 were aggregated, because it was so high, it might falsely be taken as indicating a need for a higher frequency, when, in fact, a low frequency might be more appropriate. Accordingly, the ceil parameter provides a ceil specifying the maximum appropriate usage that is to be used for purposes of aggregation for a group. (Needless to say, a group may or may not have a ceil parameter. When a group has group settings specifying a ceil parameter, the usage across the groups is aggregated with the aggregated usage of the group subject to, for example, limited to, the respective ceil parameter for that group.)

For example, with regard to FIGS. 1 and 2, when frequency governor 115 is aggregating the usage of processor core 110 across groups, the maximum usage that can be aggregated for group 250 is limited by the ceil parameter of 30%. With regard to group 210, the maximum usage that can be aggregated for processor core 110 is 100%. The different ceil parameters for groups 210 and 250 reflect the different types of tasks contained in the groups. Group 210 is a grouping of interactive tasks and when the user is interacting with a GUI or other interface, the required core performance will be high and core resources should be allocated to the tasks: accordingly the ceil parameter for group 210 is set to 100%. By contrast, as discussed above, group 250 contains background tasks and so a limited ceil parameter of 30% appropriately limits the usage that can be aggregated for this group for purposes of setting the frequency of operation of processor core 110.

Turning now to the margin parameter of the group settings, frequency governor 115 may select and/or compute a desired margin parameter, referred to hereinafter as maximized margin parameter, across the groups based on the margin parameters as specified for the groups in the group settings. Referring to flow diagram 300 of FIG. 3, this may be one aspect of steps 330 and 340. The maximized margin parameter may be added to the load parameter to provide and/or incorporate a tolerance which allows for selecting a frequency of operation with the appropriate tolerance for potential changes in usage by groups over time.

The margin parameter may generally specify an appropriate tolerance for its respective group. More particularly, the margin parameter may function as a target margin between an actual usage of the processor core and a target frequency of operation of the processor core. A margin parameter may be set on a per group basis based on the likely necessary variation in usage due to executing the tasks in the group over time. For example, because group 210 contains interactive tasks, which may vary relatively significantly in required usage over time, a relatively large tolerance may be required; this is reflected in the relatively high margin parameter of 20% specified in group settings 220. With regard to group 250, because group 250 contains background tasks, which may have relatively constant required usage over time, a relatively small tolerance may be all that is required; this is reflected in the quite low margin parameter of 3% specified in example group settings 260.

Frequency governor 115 may determine and/or calculate the maximized margin parameter across the groups by, in one aspect, selecting the largest margin parameter from among the margin parameters of the groups with tasks executing on processor core 110. In other aspects, the frequency governor may take an average of the margin parameters across the groups, determine a maximized margin parameter based on historical usage of the processor core(s) by tasks in the groups or use any number of other algorithms to determine the maximized margin parameter. With regard to FIG. 2, assuming that one of the tasks of group 210 is executing on processor core 110, the largest margin parameter across groups 210, 250 is the 20% margin specified in group settings 220 of group 210. Accordingly, this 20% margin may be used as the maximized margin parameter by frequency governor 115.

In a further aspect, the ceil parameter may also be used to limit the margin parameters and/or the maximized margin parameter. For example, the usage and the margin parameter for each group can be combined, and the margin parameter reduced by any amount the combined usage and margin parameter for that group is over the corresponding ceil parameter for that group.

The derivation of the load parameter and the maximized margin parameter across groups can be expressed by the following exemplary equations:

$$L(m) = \sum_{i \in \text{all groups}} \begin{cases} \text{ceil}(i) - \text{margin}(i), & \text{when } \text{usage}(i) > \text{ceil}(i) - \text{margin}(i), \\ \text{usage}(i), & \text{otherwise} \end{cases} \quad (1)$$

where L(m) is the load parameter with respect to the at least one processor core, m the current measurement time, i the group, and the ceil(i) and margin(i) are group settings of group i, and usage(i) is the measured usage of the at least one core by group i and corresponds to current measurement time m and:

$$M(m) = \max_{i \in \text{all groups}} \begin{cases} \text{margin}(i), & \text{when } \text{usage}(i) <= \text{ceil}(i) - \text{margin}(i), \\ \text{ceil}(i) - \text{usage}(i), & \text{when } \text{ceil}(i) - \text{margin}(i) < \text{usage}(i) <= \text{ceil}(i), \\ 0, & \text{when } \text{usage}(i) \text{ is null relative to time } m \end{cases} \quad (2)$$

where M(m) is the maximized margin parameter on the at least one processor core. Of course the preceding equations are provided for purposes of example and the technique herein is not so limited.

Frequency governor 115 may use both the load parameter L(m) determined according to the above equation (1) and the maximized margin parameter M(m) determined according to the above equation (2) to select a frequency of operation for processor core 110 to operate at. More particularly, in one aspect, the load parameter L(m) and the maximized margin parameter M(m) may be summed (see FIGS. 4a-4e) and a frequency value may be derived from the resulting sum, by, for example, multiplying the sum by a frequency factor to arrive at a derived optimal frequency for processor core 110. Frequency governor 115 may then use the derived optimal frequency to select, in step 340 of FIG. 3, the frequency of operation from one of the available discrete frequencies of operation supported by processor device 100. Of course, in many instances, the selected frequency of operation will be the same as the current frequency of operation of the processor core and the governor will not change the frequency of operation of processor core 110.

FIGS. 4a-4e are graphical representations of aggregating usage across groups utilizing the technique and aspects thereof described above, and in particular, equations (1) and (2). More particularly, FIGS. 4a-4e can be used to illustrated further aspects of the technique described above with regard to FIGS. 1-3.

Figure 4A:
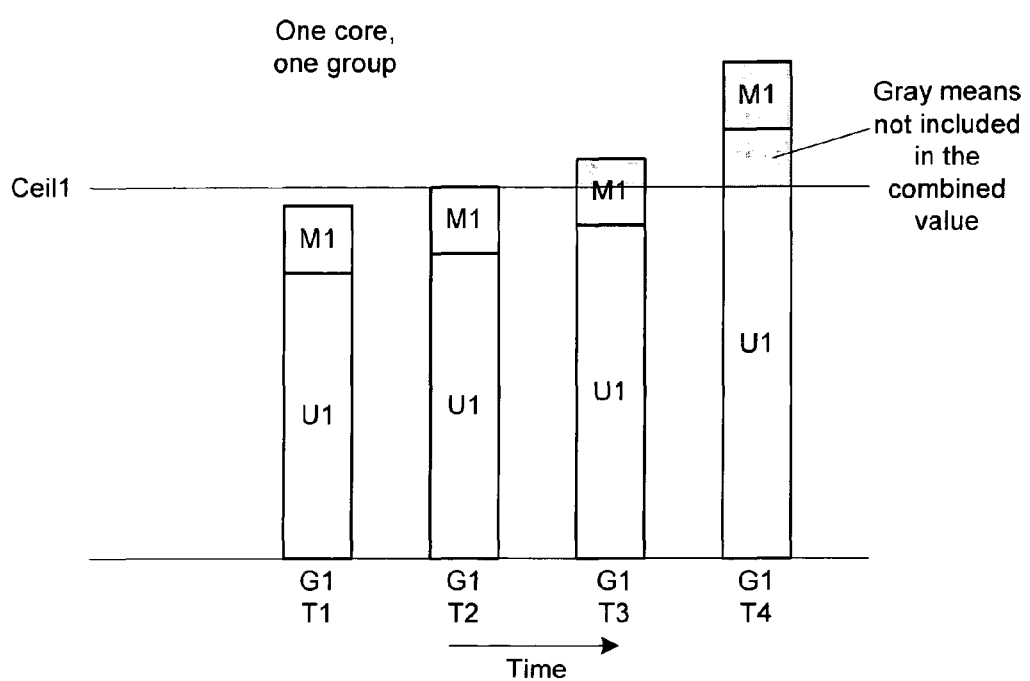
FIGS. 4a-4e illustrate embodiments of aggregating monitored usage across groups.

FIG. 4a is a diagrammatic representation of usage over time and monitoring the same for a single core and a single group, group G1. A ceil parameter for group G1 specifies a limiting ceil, ceil1, for group G1. The usage is monitored by a frequency governor, for example frequency governor 115 of processor device 100a of FIG. 1, for group G1 at times T1, T2, T3 and T4 based on the corresponding group settings. At times T1 and T2, the monitored usage and the margin parameter are below ceil1 and are taken as the combined load parameter and maximized margin parameter which are used by a frequency governor to select a frequency of operation. At time T3, the combined load parameter and maximized margin parameter are above ceil1 by a portion of the margin parameter: the margin parameter is reduced by the amount above ceil1 to provide a maximized margin parameter which is combined with the load parameter, here usage U1, to derive the optimal frequency used by a frequency governor to select a frequency of operation. At time T4, the usage for the single group is above ceil1, and thus the load parameter in this example is taken as the usage limited by ceil1. In this example, the margin parameter is not added to the load parameter because the usage already exceeds the ceil.

Figure 4B:
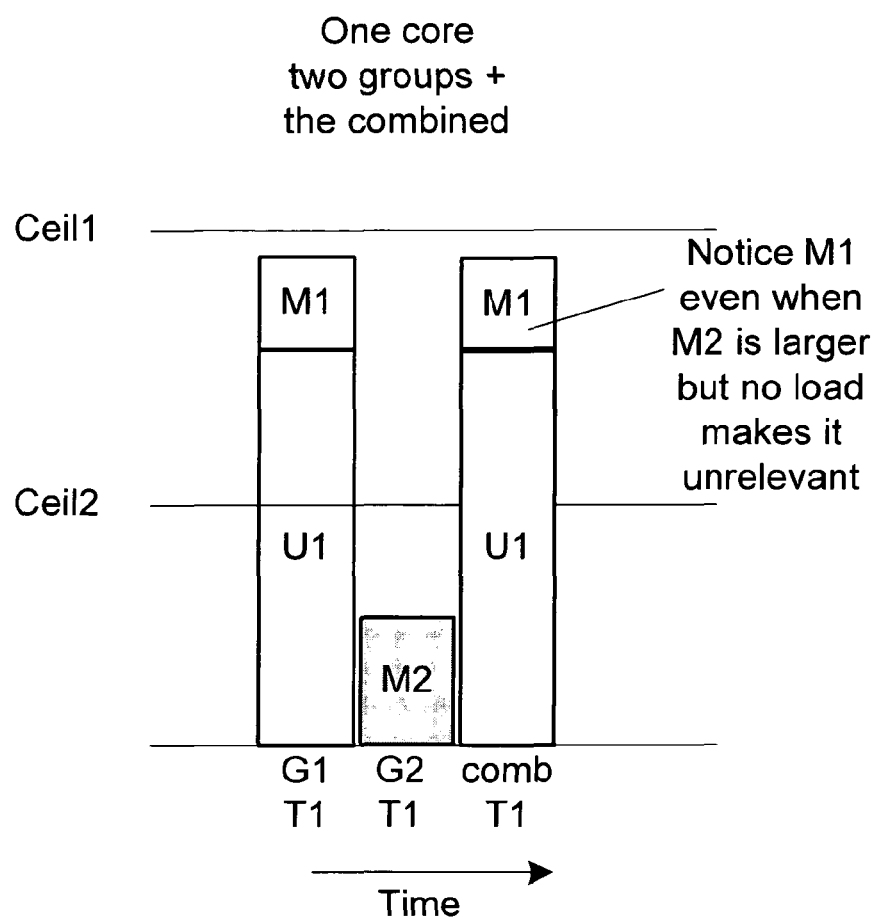

FIG. 4b is a diagrammatic representation illustrating selecting a maximized margin parameter in the case of two groups and one core. At time T1, group G2 has no tasks which are executing on the associated core, while G1 has tasks which are executing on the associated core with a usage U1. Because G2 has no tasks executing on the associated core, the margin parameter of group G2 is not selected as the maximized margin parameter and consequently not summed with usage U1, but is instead ignored and a frequency of operation selected from the summation of the load parameter (in this case usage U1, because group G2 has no usage) and margin parameter M1 of group 1.

Figure 4C:
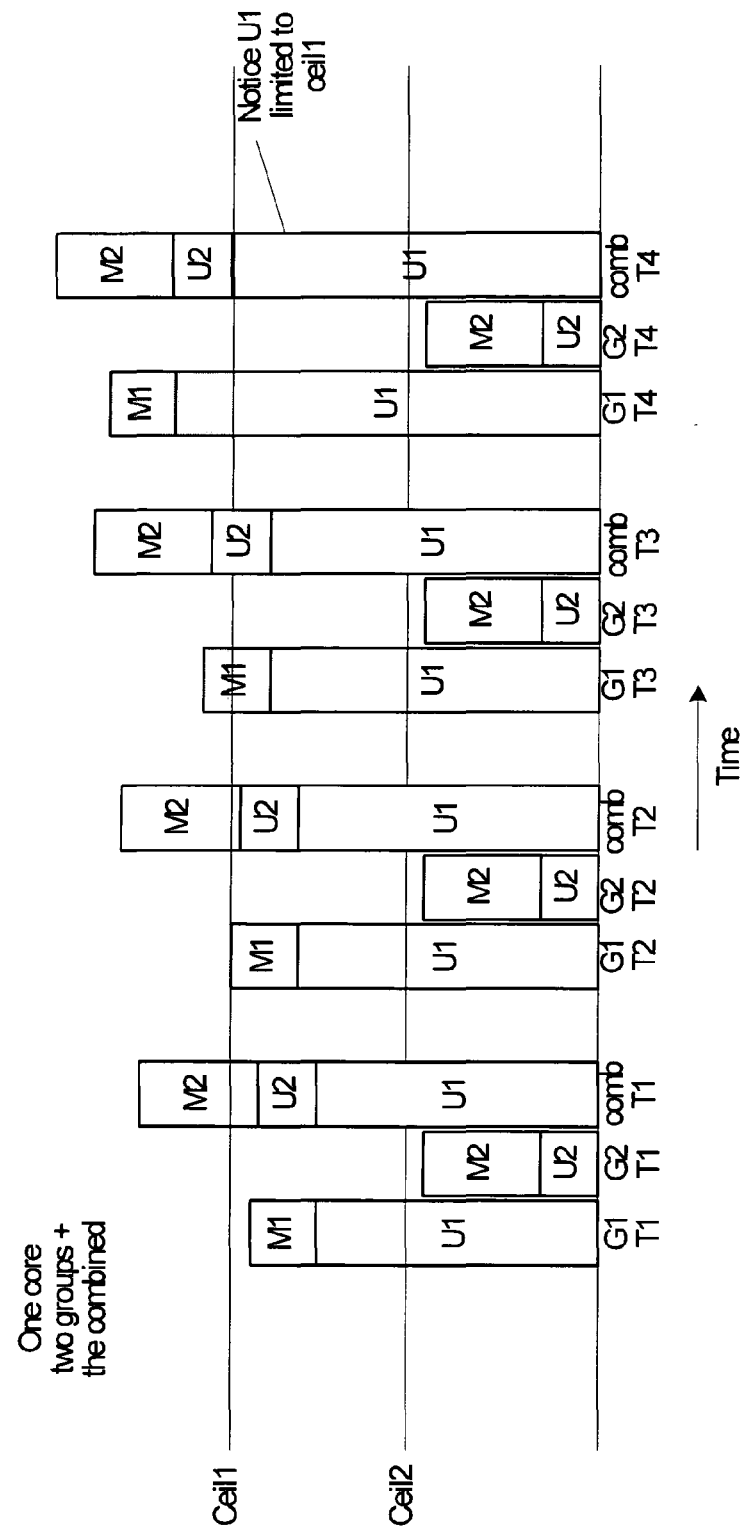

FIG. 4c is a diagrammatic representation illustrating aspects of the above techniques over time T1, T2, T3 and T4 with regard to one core and two groups G1 and G2. As can be seen, at time T1, usage U1 corresponding to the tasks in group G1 is aggregated with usage U2 corresponding to the tasks in group G2 to derive a load parameter. Because margin parameter M2 of group G2 is the largest margin parameter across groups G1 and G2, it is selected as the maximized margin parameter added to the load parameter to provide a tolerance margin (for the frequency of operation selected by the governor) as shown in the combination at T1. Similar situations hold at times T2, T3. At time T4, the usage U1 measured for group G1 exceeds ceil1 for group G1 and so is limited to ceil1 when aggregating usage U1 with usage U2 to determine the load parameter as shown in the combination at time T4 on the right.

Figure 4D:
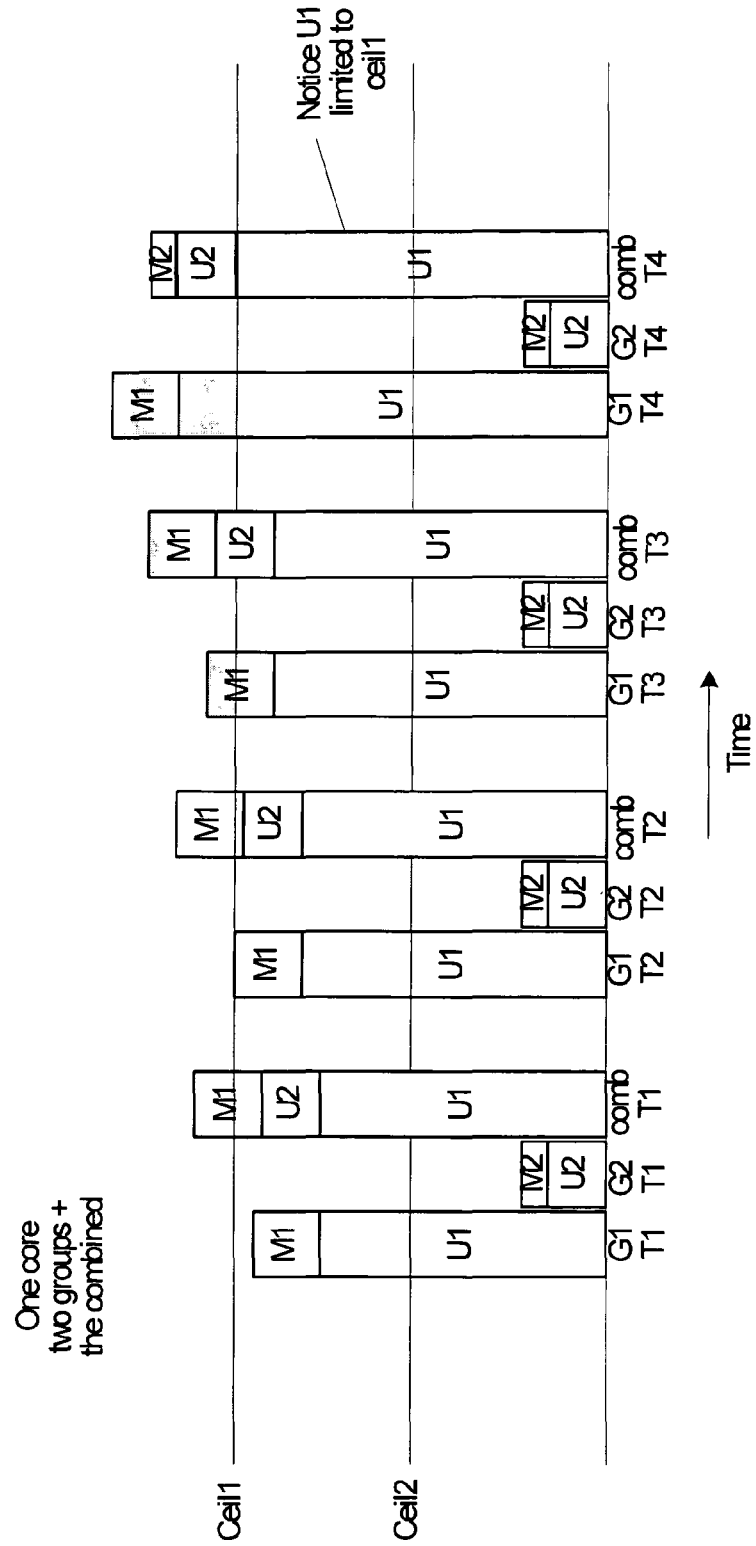

In FIG. 4d, at times T1 and T2, the usages U1 and U2 are aggregated across groups as described above to arrive at a load parameter, as seen in the corresponding combinations on the right. Similarly, the maximized margin parameter is selected across groups G1, G2 as described above. At time T3, the combined usage U1 and margin parameter M1 for group G1 are above corresponding ceil1. Accordingly, M1 is reduced by the portion of M1 above ceil1 because M1 and ceil1 correspond to the same group G1. The reduced M1 is used when selecting the maximized margin parameter across groups G1, G2, but because the reduced M1 is still greater than margin parameter M2 of group G2, it is selected as the maximized margin parameter to sum with the load parameter as shown in the combination at the right at time T3. At time T4, the usage U1 of group G1 exceeds ceil1 specified for group G1 and so both the usage U1 is limited by ceil1 for purposes of aggregating usages U1 and U2 to arrive at a load parameter as previously discussed, and furthermore, margin M1 of group G1 is ignored for purposes of selecting the maximized margin parameter across groups G1, G2 and margin parameter M2 is selected as the maximized margin parameter. This is illustrated in the combination at time T4 on the right.

Figure 4E:
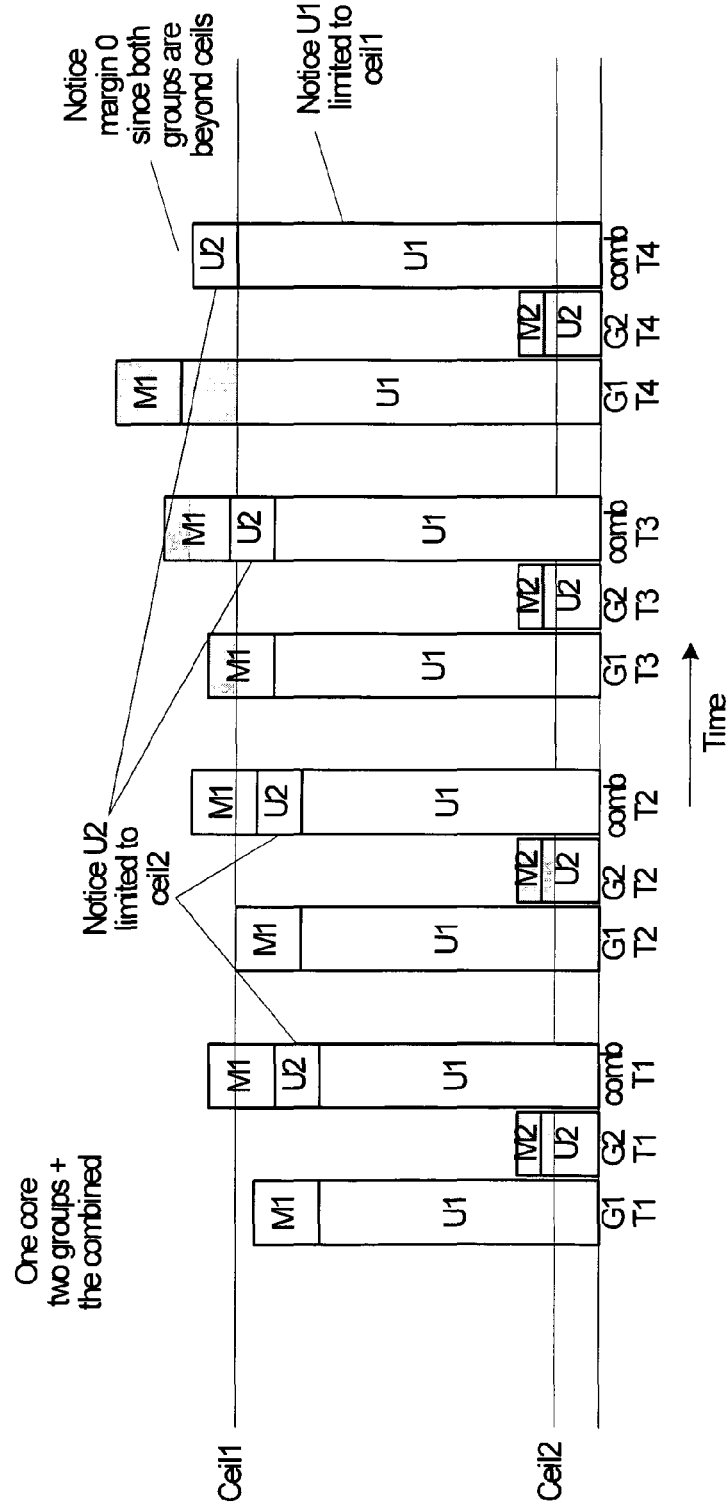

In FIG. 4e, at times T1, T2 and T3, the usages U1 and U2 are aggregated across groups as described above to arrive at a load parameter, as seen in the corresponding combinations on the right. Similarly, the maximized margin parameter is selected across groups G1, G2 as described above and shown in the corresponding combinations on the right. At time T4, both the usage U1 and U2 for groups G1 and G2, exceed the respective ceil parameters ceil1 and ceil2. Consequently, both usages U1 and U2 are limited by the respective ceils ceil1 and ceil2 for purposes of calculating the load parameter and a maximized margin parameter over groups G1, G2 is not added to the load parameter in this instance. This is shown in the combination to the right at time T4.

While the above examples have generally been discussed with respect to a processor device with a single processor core and two groups, the above technique and aspects thereof can be extended across any number of groups, as will be apparent to one of skill in the art. Furthermore, the above-discussed technique can be extended across processor devices with multiple cores as will be discussed in further detail below.

Referring to multi-core processor devices 100b and 100c of FIG. 1, frequency governor 115 is operable to access policy 125 stored in memory 120. Policy 125 comprises definition of groups of tasks and corresponding group settings. Frequency governor 115 is further operable to control power and frequency controller module 130 which in turn is operable to control the clock source and the power source to provide a number of discrete frequencies and corresponding voltages to processor cores 1 to 4.

Figure 5A:
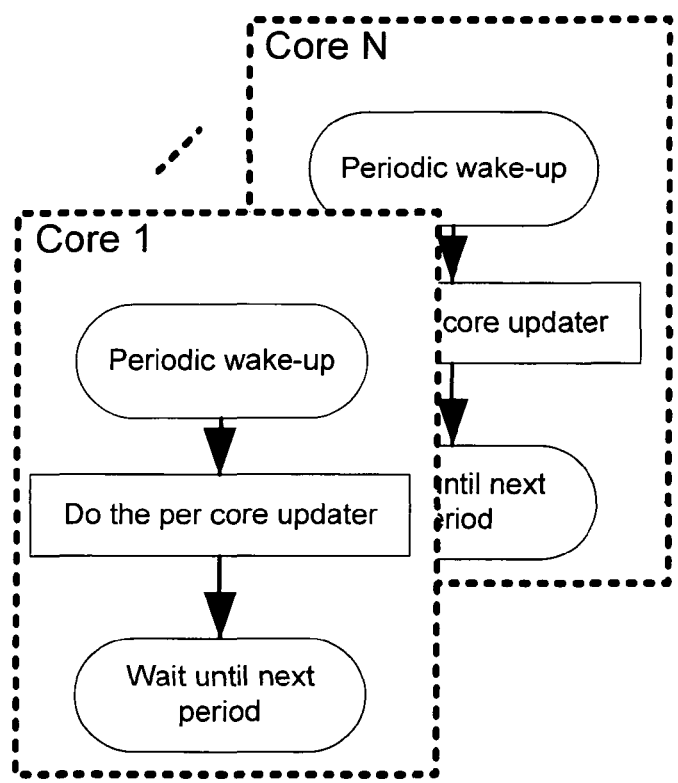
FIGS. 5a-5d show flow diagrams of method embodiments of aspects of selecting one or more frequencies of operation for multi-core processor devices.
Figure 5B:
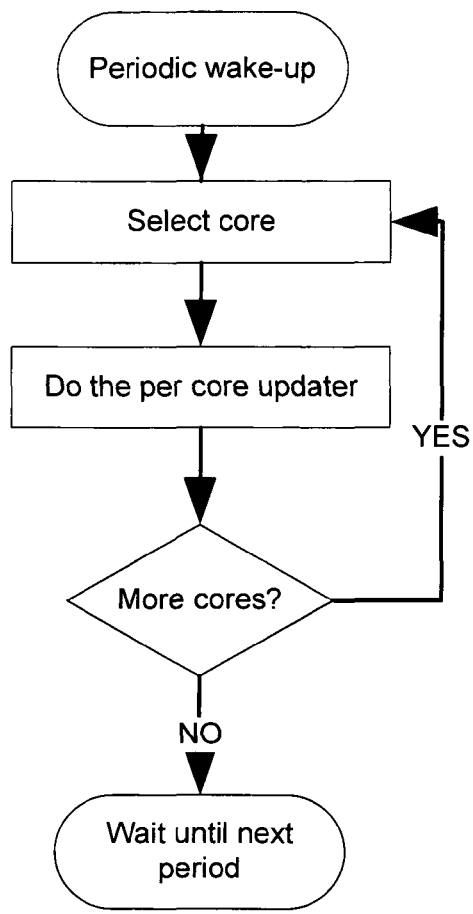

FIGS. 5a to 5d are flow diagrams illustrating aspects for extending the technique described in relation to a processor device with a single processor core to a multi-core processor device. FIG. 5a illustrates that the frequency governor 115 may run as a background task which periodically awakens with regard to each processor core of a multi-core processor and performs a core analysis similar to the analysis described with relation to FIG. 3 for the respective processor core. FIG. 5b illustrates a technique whereby the frequency governor 115 may sequentially perform a core analysis for each processor core of a multi-core processor at each wakening.

Figure 5C:
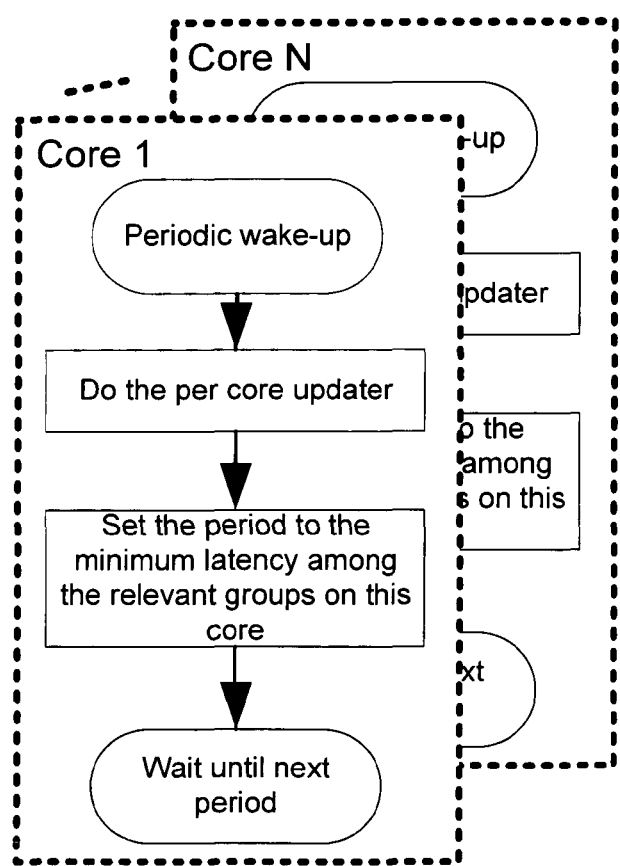
Figure 5D:
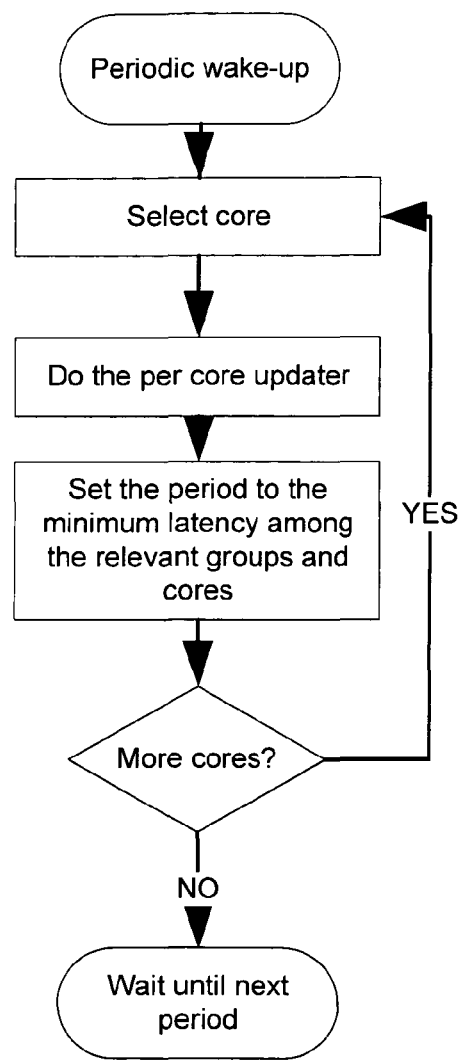

FIGS. 5c and 5d are flow diagrams illustrating similar techniques with regard to extending the technique of FIG. 3 across multiple processor cores, but with regard to groups or cores associated with different latency periods for performing the core analysis. In one aspect, the periodic wake-up and/or latency period of FIGS. 5a-5d correspond to one or more measurement periods of the groups. In the examples illustrated by the flow diagrams of FIGS. 5c and 5d, the minimum latency period across the groups is selected as the time period for implementing the above technique across the cores and/or groups.

Figure 6B:
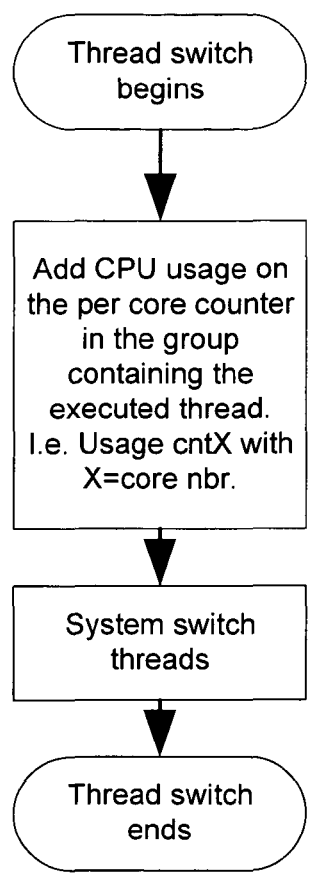
Figure 6E:
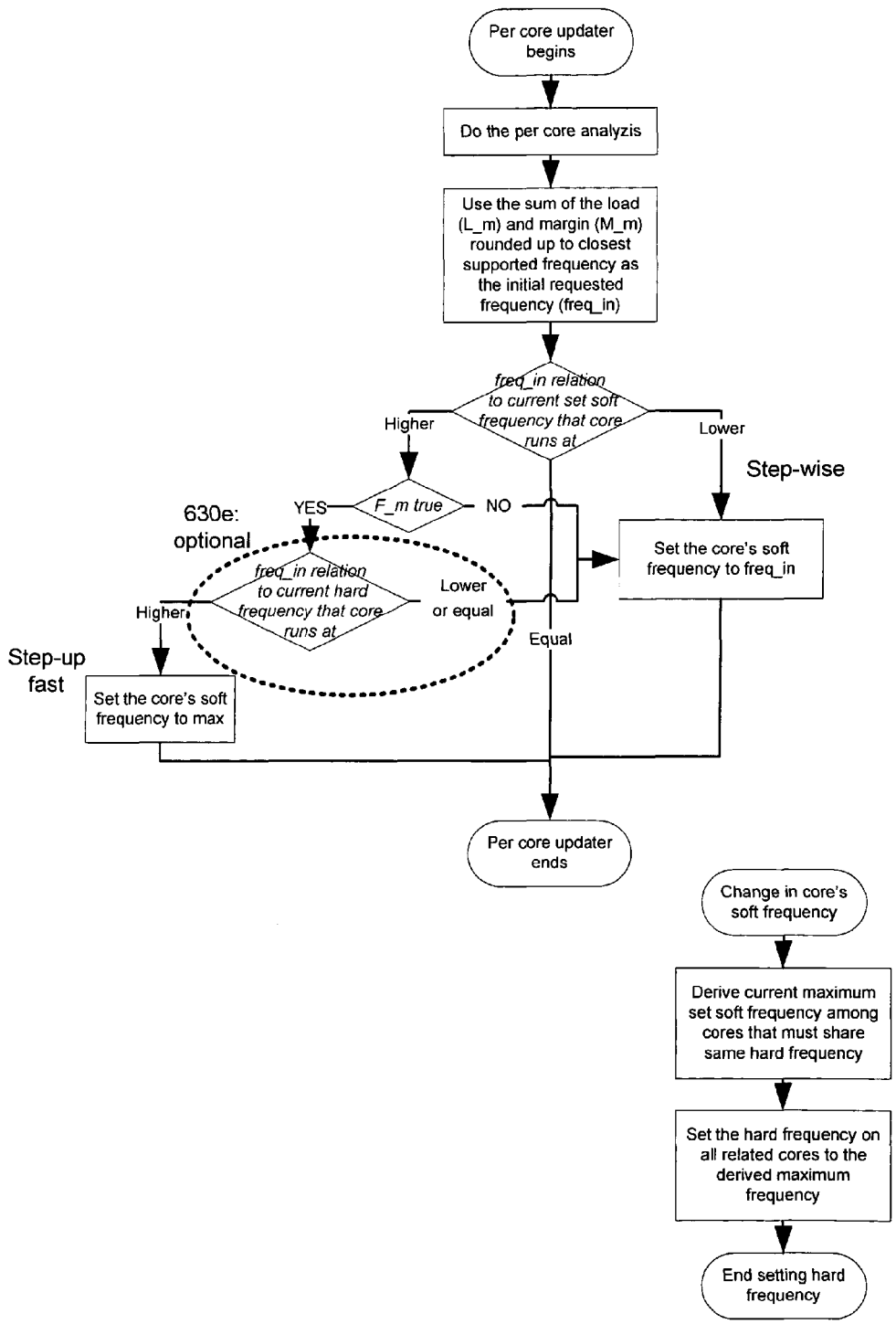

FIGS. 6a-6e are detailed flow diagrams of pseudo-code steps used to implement aspects of the above described technique and provide very specific implementation examples. For example, subroutines 610a of FIG. 6a, 610c of FIGS. 6c and 610d of FIG. 6d effect equation (1). Similarly, subroutines 620a of FIG. 6a, 620c of FIGS. 6c and 620d of FIG. 6d effect equation (2). Subroutine 630a of FIG. 6a further shows a very detailed process for normalizing a group ceil parameter encompassing multiple processor cores relative to a single processor core ceil parameter to arrive at a normalized single processor core ceil parameter with a maximum value of 100% in a multi-core processor device. Subroutines 630c and 630d of FIGS. 6c and 6d, respectively, show a very detailed subroutine for normalizing a usage of a multi-core processor device (which may exceed 100%) to a normalized maximum of 100% for each processor core. Subroutine 630e of FIG. 6e illustrates a detailed subroutine for determining if a fast flag associated with a multi-core processor device is to be disregarded for purposes of raising the frequency of operation to the maximum frequency of operation for the multi-core processor device. As the pseudo-code representations of FIGS. 6a-6e are believed to be self-explanatory in the light of the above description, a more detailed discussion thereof is omitted herein.

The above-described steps 310 to 350 of FIG. 3 may generally be carried out at periodic or varying intervals of time to dynamically change the frequency of operation of processor cores 1-4 of FIG. 1 for example in accordance with FIGS. 5a-5c and FIGS. 6a-6e. Because the frequency of operation is dynamically varied at the level of the processor cores, a frequency of operation for the cores is continually selected that provides sufficient core performance to execute the tasks while simultaneously conserving power by minimizing the power expended per frequency cycle.

In a processor device with multiple processor cores constrained to operate at the same frequency of operation, the highest frequency of operation selected for a processor core of the multiple processor cores may in turn be selected as the optimal frequency of operation for the processor cores of the processor device. The optimal frequency of operation of the processor cores may be compared with the actual frequency of operation of the cores. If the optimum frequency of operation is above the current frequency of operation of the processor cores of the processor device, then if all fast flags are set to no, the frequency of operation of the processor cores may be increased in a stepwise manner to the next available discrete frequency of operation for the processor device.

If, however, a fast flag is set to yes, thus indicating that at least one of the relevant groups contains one or more tasks requiring a maximum core performance to be available, then the frequency of operation of the processor cores is increased to the maximum available discrete frequency of operation and the selected core shall run at the corresponding maximum voltage.

However, in an optimized aspect, individual fast flags are examined per processor core: if it is determined that the processor cores corresponding to the set fast flags do not require additional core performance, said fast flags are disregarded for setting a maximum frequency of operation.

If the optimum frequency of operation is below the current frequency of operation of the selected core, then more core performance than is sufficient to execute all the tasks in the groups is being provided. That is, relating the above to the physical usage of the selected core, the selected core is maintaining a larger margin of core performance than is necessary. If a lower discrete frequency of operation is available that is equal to or greater than the optimum frequency of operation, than the lowest available discrete frequency of operation that is equal to or greater than the optimum frequency of operation is selected as the new frequency of operation of the selected core.

As would be understood by one of skill in the art, for multi-core processor devices with processor cores which may operate at different frequencies and voltages of operation relative to each other, the frequency of operation of individual processor cores may be selected individually according to the above-described technique. Thus, based on the tasks executing on the individual processor cores, the processor cores may operate at different frequencies relative to each other.

In one optimized aspect of the technique disclosed above, the usage can be expressed relative to an absolute maximum or minimum frequency of operation of the core. The advantage of expressing usage relative to these absolute values is that in implementation, when the above discussed equations are executed using these absolute values, a possible division by the frequency governor executing on the core(s) is avoided. As would be understood by one of skill in the art, executing division operations may be computationally expensive, and thus avoiding the same reduces the computation resources required to implement the above techniques on the core(s).

As has become apparent, the above-disclosed embodiments define a technique for operating or using a processor device which minimizes power consumption while still maintaining the necessary frequency of operation for sufficient processing performance of software threads/tasks. The technique disclosed herein may thus provide for dynamically varying the frequency of operation of the processor core(s) of a processor device to select a lowest frequency of operation of the core which maintains the appropriate core performance for the tasks to be executed on the core(s). More particularly, the technique disclosed herein may be implemented to minimize wasted core performance, while preserving an appropriate level of core performance to execute tasks. Thus, power is conserved while simultaneously a level of core performance appropriate to the tasks to be executed can be maintained.

In processor devices with a single core or processor devices with multiple cores which are constrained to run at a common frequency of operation, the frequency of operation of the core(s) may thus be varied over time to minimize frequency and the voltage of operation, thus conserving power, while simultaneously running at a frequency of operation which maintains a level of core performance appropriate to the tasks to be executed. In multi-core processor devices with multiple cores which can operate at different frequencies and voltages, the technique disclosed herein may be even more effective, because the frequency of operation may be set individually for each core, allowing for minimizing frequency for each individual core, while still providing an optimal level of performance for the tasks scheduled to be executed on the individual cores. Because in this example, different cores may run at different frequencies, using the technique herein, wasted core performance is further reduced, thus conserving yet a further margin of power.

For example, in a multi-core processor device with two cores, one of the cores may generally execute graphics-intensive tasks, while the other core may generally execute background tasks. The graphics-intensive tasks may require high core performance to allow for executing computationally intensive tasks, thus requiring the core operate at a high frequency of operation and maintain a relatively high core performance, while the other core which executes primarily background tasks may operate at a relatively lower frequency of operation and require only a relatively low core performance because the background tasks may have a relatively constant core performance requirement. In this way, by optimizing frequency per individual core according to aspects of the technique herein, power may be conserved.

It is believed that many advantages of the present invention will be fully understood from the foregoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method of operating a processor device having at least one processor core, said method comprising:
    executing multiple tasks on the at least one processor core, wherein the multiple tasks are grouped into at least two groups such that tasks from at least two different groups execute on the at least one processor core, wherein tasks from the at least two groups executing on the at least on processor core have differing core performance requirements relative to each other and each of the at least two groups is assigned one or more group settings reflecting the differing core performance requirements;
    monitoring usage of the at least one processor core by tasks in the at least two different groups and compiling the monitored usages on a per group basis;
    aggregating the compiled usages of the at least one processor core across the at least two different groups subject to the one or more group settings to determine a usage of the at least one processor core by the at least two different groups, the one or more group settings controlling the respective contribution of each of the individual groups to the aggregation;

deriving a load parameter for the at least one processor core based on the determined usage of the processor core by the at least two different groups, wherein the load parameter is indicative of the aggregated usage of the at least one processor core by the tasks in the groups as controlled by the one or more group settings across the at least two different groups;

selecting a frequency of operation for the at least one processor core based upon the load parameter; and changing the frequency of operation of the at least one processor core to the selected frequency of operation.

2. The method of claim 1, wherein monitoring usage of the at least one processor core comprises repeatedly measuring usage of the at least one processor core by individual tasks in the at least two different groups on a per group basis over time.

3. The method of claim 1, wherein the one or more group settings for one or more of the groups comprise a measurement period for the respective one of the one or more of the groups and wherein deriving the load parameter is performed periodically based on the at least one measurement period.

4. The method of claim 1, wherein the group settings comprise at least one of a ceil parameter and a margin parameter, wherein the ceil parameter is a target maximum usage of the at least one processor core by the tasks in the associated group and the margin parameter is a target margin between an usage of the processor core and a target frequency of operation of the processor core.

5. The method of claim 4, wherein the group settings are combined across one or more groups to derive a maximized margin parameter for the at least one core.

6. The method of claim 5, wherein deriving the maximized margin parameter comprises selecting a largest margin parameter subject to the group settings of the individual groups and/or the usage of the at least one core by one or more groups.

7. The method of claim 6, wherein the selected largest margin parameter is reduced based on a relation between the measured usage and the group settings of one or more groups or based on the usage of the at least one core by the group corresponding to the selected largest margin parameter being below a minimum usage threshold.

8. The method of claim 1, wherein each group is associated with at least one usage log, each usage log corresponding to a processor core and said method further comprises:

for each group, logging the usage of the at least one core by the tasks in the group in the usage log associated with the group and corresponding to the at least one core.

9. The method of claim 5, wherein selecting a frequency of operation based upon the load parameter comprises:

summing the load parameter and the maximized margin parameter;

deriving a frequency value from the summation of the load parameter and maximized margin parameter; and selecting the frequency of operation and, optionally, a corresponding voltage for the at least one processor core based upon the derived frequency value.

10. The method of claim 4, wherein the load parameter on the at least one processor core is:

$$L(m) = \sum_{i \in all\ groups} \begin{cases} \text{ceil}(i) - \text{margin}(i), & \text{when usage}(i) > \text{ceil}(i) - \text{margin}(i); \\ \text{usage}(i), & \text{otherwise} \end{cases}$$

where L(m) is the load parameter with respect to the at least one processor core, m the current measurement period, i the group, the ceil(i) and margin(i) are group settings of group i, and usage(i) is the measured usage of the at least one core by group i and corresponds to current measurement period m; and wherein the maximized margin parameter on the at least one processor core is:

$$M(m) = \max_{i \in all\ groups} \begin{cases} \text{margin}(i), & \text{when usage}(i) <= \text{ceil}(i) - \text{margin}(i); \\ \text{ceil}(i) - \text{usage}(i), & \text{when ceil}(i) - \text{margin}(i) < \text{usage}(i) <= \text{ceil}(i); \\ 0, & \text{when usage}(i) \text{ is null relative to time } m. \end{cases}$$

11. The method of claim 1, wherein the at least one processor core operates at discrete frequencies, wherein the frequency of operation of the at least one processor core is selected to be one of the available discrete frequencies to maintain a tolerance margin for said processor core.

12. The method of claim 1, wherein a highest frequency of operation supported by the at least one processor core is selected based on the group settings.

13. The method of claim 1, wherein the frequency of operation of the at least one processor core differs from the frequency of operation of one or more other processor cores of the processor device.

14. A processor system comprising:

a processor device with at least one processor core, the at least one processor core being operable to execute multiple tasks grouped into groups, the multiple tasks being from at least two different groups such that the at least one processor executes tasks from at least two different groups, where tasks from the at least two different groups have differing core performance requirements relative to each other and each of the at least two different groups is assigned one or more group settings reflecting the differing core performance requirements; and a frequency governor operable to:

monitor usage of the at least one processor core by tasks in the at least two different groups and compile the monitored usage on a per group basis;

aggregate the compiled usages of the at least one processor core across the at least two different groups subject to the one or more group settings to determine a usage of the at least one processor core by the at least two different groups, wherein the one or more group settings control the respective contribution of each of the individual groups to the aggregation;

derive a load parameter for the at least one processor core based on the determined usage of the processor core by the at least two different groups, wherein the load parameter is indicative of the aggregated usage of the at least one processor core by the tasks in the groups as controlled by the one or more group settings across the at least two different groups;

select a frequency of operation for the at least one processor core based upon the load parameter; and change the frequency of operation of the at least one processor core to the selected frequency of operation.

15. The processor system of claim 14, wherein the frequency governor is operable to monitor usage of the at least one processor core by repeatedly measuring usage of the at least one processor core by individual tasks in the at least two different groups on a per group basis over time.

16. The processor system of claim 14, wherein the one or more group settings for one or more of the groups comprise a measurement period for the respective one of the one or more of the groups and wherein the frequency governor is operable to periodically perform deriving the load parameter based on the at least one measurement period.

17. The processor system of claim 14, wherein the group settings comprise at least one of a ceil parameter and a margin parameter, wherein the ceil parameter is a target maximum usage of the at least one processor core by the tasks in the associated group and the margin parameter is a target margin between a usage of the processor core and a target frequency of operation of the processor core.

18. The processor system of claim 17, wherein the system is operable to combine the group settings across one or more groups to derive a maximized margin parameter for the at least one core.

19. The processor system of claim 18, wherein the system is operable to derive the maximized margin parameter by selecting a largest margin parameter subject to the group settings of the individual groups and/or the usage of the at least one core by one or more groups.

20. The processor system of claim 19, wherein the system is operable to reduce the selected largest margin parameter based on a relation between the measured usage and the group settings of one or more groups or based on the usage of the at least one core by the group corresponding to the selected largest margin parameter being below a minimum usage threshold.

21. The processor system of claim 14, wherein each group is associated with at least one usage log, each usage log corresponding to a processor core and wherein the frequency governor is further operable to:

for each group, log the usage of the at least one core by the tasks in the group in the usage log associated with the group and corresponding to the at least one core.

22. The processor system of claim 18, wherein the frequency governor is operable to selecting a frequency of operation based upon the load parameter by:

summing the load parameter and the maximized margin parameter;

deriving a frequency value from the summation of the load parameter and maximized margin parameter; and selecting the frequency of operation and, optionally, a corresponding voltage for the at least one processor core based upon the derived frequency value.

23. The processor system of claim 17, wherein the load parameter on the at least one processor core is:

$$L(m) = \sum_{i \in all\ groups} \begin{cases} ceil(i) - margin(i), & when\ usage(i) > ceil(i) - margin(i); \\ usage(i), & otherwise \end{cases}$$

where L(m) is the load parameter with respect to the at least one processor core, m the current measurement period, i the group, the ceil(i) and margin(i) are group settings of group i, and usage(i) is the measured usage of the at least one core by group i and corresponds to current measurement period m; and wherein the maximized margin parameter on the at least one processor core is:

$$M(m) = \max_{i \in all\ groups} \begin{cases} margin(i), & when\ usage(i) <= ceil(i) - margin(i); \\ ceil(i) - usage(i), & when\ ceil(i) - margin(i) < usage(i) <= ceil(i); \\ 0, & when\ usage(i)\ is\ null\ relative\ to\ time\ m. \end{cases}$$

24. The processor system of claim 14, wherein the at least one processor core operates at discrete frequencies and wherein the frequency governor is operable to set the frequency of operation of the at least one processor core to be one of the available discrete frequencies to maintain a tolerance margin for said processor core.

25. The processor system of claim 14, wherein the frequency governor is operable to set a highest frequency of operation supported by the at least one processor core based on the group settings.

26. The processor system of claim 14, wherein the frequency of operation of the at least one processor core differs from the frequency of operation of one or more other processor cores of the processor device.

* * * * *

UNITED STATES PATENT AND TRADEMARK OFFICE
CERTIFICATE OF CORRECTION

Page 1 of 2

PATENT NO. : 9,086,876 B2
APPLICATION NO. : 13/579923
DATED : July 21, 2015
INVENTOR(S) : Gustafsson It is certified that error appears in the above-identified patent and that said Letters Patent is hereby corrected as shown below:

On the Title Page, in Item (75), under "Inventor", in Column 1, Line 1, delete "Harald Gustaffson," and insert -- Harald Gustafsson, --, therefor.

IN THE DRAWINGS

In Fig. 6c$_1$, Sheet 18 of 22, in Line 6, delete "margin_i) and absloute" and insert -- margin_i) and absolute --, therefor.

In Fig. 6d$_1$, Sheet 20 of 22, delete "margin_i) and absloute" and insert -- margin_i) and absolute --, therefor.

In Fig. 6e, Sheet 22 of 22, delete " 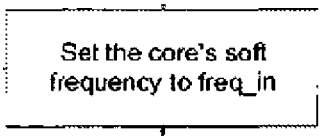 " and insert -- 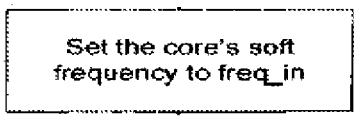 --, therefor.

IN THE SPECIFICATION

In Column 1, Line 8, delete "§119" and insert -- § 119 --, therefor.

In Column 2, Lines 44-47, delete "of the........operation." and insert the same at Line 43, after "usage" as a continuation paragraph.

In Column 2, Line 61, delete "govenor." and insert -- governor. --, therefor.

Signed and Sealed this
Twenty-second Day of March, 2016

Michelle K. Lee
*Director of the United States Patent and Trademark Office*

CERTIFICATE OF CORRECTION (continued)
U.S. Pat. No. 9,086,876 B2

IN THE SPECIFICATION

In Column 8, Lines 9-20, delete "exist per……..cores." and insert the same at Line 8, after "counter can" as a continuation paragraph.

In Column 12, Line 41, delete "to illustrated" and insert -- to illustrate --, therefor.

IN THE CLAIMS

In Column 16, Line 56, in Claim 1, delete "on" and insert -- one --, therefor. (2nd occurrence)